(12) United States Patent
Ren et al.

(10) Patent No.: US 11,844,305 B2
(45) Date of Patent: Dec. 19, 2023

(54) WALK-BEHIND SELF-PROPELLED WORKING MACHINE

(71) Applicant: Nanjing Chervon Industry Co., Ltd., Nanjing (CN)

(72) Inventors: Yufei Ren, Nanjing (CN); Yang Li, Nanjing (CN); Ronggen Zhu, Nanjing (CN); Haishen Xu, Nanjing (CN); Rui Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/869,830

(22) Filed: Jul. 21, 2022

(65) Prior Publication Data

US 2022/0361401 A1    Nov. 17, 2022

Related U.S. Application Data

(63) Continuation of application No. 17/576,567, filed on Jan. 14, 2022, which is a continuation of application No. PCT/CN2020/104524, filed on Jul. 24, 2020.

(30) Foreign Application Priority Data

Jul. 25, 2019 (CN) .......................... 201910674384.8
Oct. 21, 2019 (CN) .......................... 201911001974.0

(51) Int. Cl.
*A01D 34/78* (2006.01)
*A01D 34/68* (2006.01)
*A01D 101/00* (2006.01)

(52) U.S. Cl.
CPC ......... *A01D 34/6806* (2013.01); *A01D 34/78* (2013.01); *A01D 2034/6843* (2013.01); *A01D 2101/00* (2013.01)

(58) Field of Classification Search
CPC ................ A01D 34/6806; A01D 34/78; A01D 2034/6843; A01D 2101/00; A01D 34/006; A01D 34/69; A01D 34/001; Y02T 10/72
See application file for complete search history.

(56) References Cited

U.S. PATENT DOCUMENTS

| 5,442,901 A | 8/1995 | Niemela |
| 5,575,140 A | 11/1996 | Guillory et al. |

(Continued)

FOREIGN PATENT DOCUMENTS

| AU | 2020317357 A | 2/2022 |
| CN | 1862060 A | 11/2006 |

(Continued)

OTHER PUBLICATIONS https://www.pololu.com/product/2730 (used int he response to arguments) Dec. 2001.*

(Continued)

*Primary Examiner* — Kevin Hurley
*Assistant Examiner* — Marlon A Arce
(74) *Attorney, Agent, or Firm* — Greenberg Traurig, LLP

(57) ABSTRACT

A walk-behind self-propelled working machine includes a main body, an operation switch, and a handle device. The main body includes a moving assembly and a drive motor. The operation switch is connected to the drive motor. The handle device is connected to the main body and includes an operation member, a connecting rod, and a sensing device. The operation member includes a gripping portion for a user to hold. The connecting rod is connected to the main body. The sensing device is configured to sense a thrust that is applied to the handle device to drive the walk-behind self-propelled working machine and further includes a pressure sensor and a pressing member. When the gripping portion receives the thrust, the pressing member applies a (Continued)

force along a preset straight line to the pressure sensor to drive the pressure sensor to deform.

17 Claims, 13 Drawing Sheets

(56) References Cited

U.S. PATENT DOCUMENTS

| | | | |
|---|---|---|---|
| 6,065,555 A | 5/2000 | Yuki et al. | |
| 6,082,083 A | 7/2000 | Stalpes et al. | |
| 8,327,961 B2* | 12/2012 | Arpino | B62D 51/04 180/19.1 |
| 8,733,477 B1 | 5/2014 | Cook | |
| 9,545,054 B2 | 1/2017 | Prinzo | |
| 9,696,749 B2 | 7/2017 | Kaskawitz et al. | |
| 10,111,381 B2* | 10/2018 | Shaffer | B62B 5/0073 |
| 2008/0252436 A1 | 10/2008 | Souda | |
| 2009/0266042 A1 | 10/2009 | Mooney et al. | |
| 2012/0097469 A1 | 4/2012 | Yang et al. | |
| 2013/0046448 A1 | 2/2013 | Fan et al. | |
| 2017/0367259 A1 | 12/2017 | Shaffer et al. | |
| 2018/0146619 A1 | 5/2018 | Oota et al. | |
| 2019/0307066 A1 | 10/2019 | Jiang et al. | |
| 2020/0107497 A1 | 4/2020 | Ferrell et al. | |
| 2020/0375102 A1 | 12/2020 | Arendt et al. | |
| 2022/0132732 A1 | 5/2022 | Ren | |
| 2023/0037664 A1 | 2/2023 | Zhu | |

FOREIGN PATENT DOCUMENTS

| | | |
|---|---|---|
| CN | 102232333 A | 11/2011 |
| CN | 106034568 A | 10/2016 |
| CN | 106263399 A | 1/2017 |
| CN | 205883996 U | 1/2017 |
| CN | 106385938 A | 2/2017 |
| CN | 106385982 A | 2/2017 |
| CN | 107371562 A | 11/2017 |
| CN | 207022561 U | 3/2018 |
| CN | 108032895 A | 5/2018 |
| CN | 106034568 B | 7/2018 |
| CN | 108777940 A | 11/2018 |
| CN | 108781713 A | 11/2018 |
| CN | 108790946 A | 11/2018 |
| CN | 109199803 A | 1/2019 |
| CN | 208572762 U | 3/2019 |
| CN | 106385938 B | 4/2019 |
| CN | 110636754 A | 12/2019 |
| CN | 110651584 A | 1/2020 |
| CN | 210610330 U | 5/2020 |
| CN | 112293033 A | 2/2021 |
| CN | 215601945 U | 1/2022 |
| CN | 215601946 U | 1/2022 |
| CN | 215601947 U | 1/2022 |
| CN | 112293030 B | 7/2022 |
| FR | 2755573 A1 | 5/1998 |
| JP | H11262111 A | 9/1999 |
| WO | 2017/158095 A1 | 9/2017 |
| WO | 2017215051 A1 | 12/2017 |
| WO | 2018201525 W | 11/2018 |
| WO | 2020/088195 A1 | 5/2020 |

OTHER PUBLICATIONS

ISA/CN, International Search Report issued on PCT application No. PCT/CN2020/104524, dated Sep. 16, 2020, 4 pages.
ISA/CN, English translation of International Search Report issued on PCT application No. PCT/CN2020/104524, dated Sep. 16, 2020, 2 pages.
ISA/CN, Written Opinion issued on PCT application No. PCT/CN2020/104524, dated Sep. 16, 2020, 3 pages.
ISA/CN, English translation of Written Opinion issued on PCT application No. PCT/CN2020/104524, dated Sep. 16, 2020, 3 pages.
EPO, extended European search report issued on European patent application No. 20843060.3, dated Jul. 12, 2022, 8 pages.
CIPO, office action issued on Canadian patent application No. 3,148,298, dated Mar. 9, 2023, 5 pages.
Examination report from AU application No. 2020317357, dated May 17, 2023, 4 pp.

* cited by examiner

WALK-BEHIND SELF-PROPELLED WORKING MACHINE

RELATED APPLICATION INFORMATION

This application is a continuation of U.S. application Ser. No. 17/576,567, filed on Jan. 14, 2022, which application is a continuation of International Application Number PCT/CN2020/104524, filed on Jul. 24, 2020, through which this application also claims the benefit under 35 U.S.C. § 119(a) of Chinese Patent Application No. CN 201910674384.8, filed on Jul. 25, 2019, and Chinese Patent Application No. CN 201911001974.0, filed on Oct. 21, 2019, all of which are incorporated herein by reference in their entirety.

BACKGROUND

A walk-behind self-propelled lawn mower is generally a machine used by a user to mow home lawns. When the user pushes the lawn mower on the grass for a long time to mow the lawn, a lot of physical efforts are consumed. To reduce a labor intensity of an operator mowing the grass, a self-moving lawn mower appears on the market. In some related lawn mowers with a self-moving function, the self-moving function requires manual control, only a constant speed can be outputted, and the user can only follow the lawn mower and perform a mowing operation. In some relatively advanced lawn mowers, a self-moving system is complicated to operate, resulting in poor user comfort and relatively poor reliability.

SUMMARY

In one example, a walk-behind self-propelled working machine includes a main body, an operation switch, and a handle device. The main body includes a moving assembly and a drive motor configured to drive the moving assembly. The operation switch is connected to the drive motor. The handle device is connected to the main body and includes an operation member, a connecting rod, and a sensing device. The operation member includes a gripping portion for a user to hold. The connecting rod is connected to the main body. The sensing device is configured to sense a thrust that is applied to the handle device to drive the walk-behind self-propelled working machine and further includes a pressure sensor, a pressing member, and a preload element. The pressure sensor is disposed between the operation member and the connecting rod. When the gripping portion receives the thrust, the pressing member applies a force along a preset straight line to the pressure sensor to drive the pressure sensor to deform. The preload element is configured to apply a preload force to the pressure sensor. A ratio of a component of the thrust received by the gripping portion along the preset straight line to a deformation amount of the pressure sensor along the preset straight line is greater than or equal to 40 N/mm and less than or equal to 1200 N/mm. The operation switch is capable of generating a control signal according to the thrust sensed by the pressure sensor to control a rotational speed of the drive motor.

In one example, the walk-behind self-propelled working machine has a low-speed driving mode and an adaptive mode, where in the case where the thrust is less than a first preset value, the walk-behind self-propelled working machine is in the low-speed driving mode; and in the case where the thrust is greater than a second preset value, the walk-behind self-propelled working machine is in the adaptive mode.

In one example, in the case where the walk-behind self-propelled working machine is in the low-speed driving mode, a control module controls the rotational speed of the drive motor to be less than or equal to a first preset rotational speed; and in the case where the walk-behind self-propelled working machine is in the adaptive mode, the control module controls the rotational speed of the drive motor to change toward a desired rotational speed obtained according to the thrust, where the desired rotational speed is greater than the first preset rotational speed.

In one example, the first preset value is equal to the second preset value.

In one example, the first preset value is less than the second preset value, and in the case where the thrust is less than the second preset value, the walk-behind self-propelled working machine is in the low-speed driving mode.

In one example, in the case where the thrust is greater than or equal to the first preset value and less than the second preset value, the walk-behind self-propelled working machine is in the low-speed driving mode.

In one example, in the case where the thrust is greater than 0 and less than the first preset value, the walk-behind self-propelled working machine is in the low-speed driving mode.

In one example, in the case where the thrust is greater than 0 and less than the first preset value and a duration of the thrust is less than a preset duration, the control module controls the rotational speed of the drive motor to be less than or equal to the first preset rotational speed; and in the case where the thrust is greater than 0 and less than the first preset value and the duration of the thrust is greater than the preset duration, the control module controls the rotational speed of the drive motor to be 0.

In one example, in the case where a value of the thrust is less than or equal to 0, the drive motor of the walk-behind self-propelled working machine outputs a rotational speed of 0.

In one example, a conversion module is further included and configured to obtain the desired rotational speed according to the thrust sensed by the sensing device.

In one example, the drive motor further includes an activated state and a non-activated state, where in the case where the thrust is less than the second preset value, the drive motor is not activated; and in the case where the thrust is greater than or equal to the second preset value, the desired rotational speed is greater than a second preset rotational speed, and a duration is greater than or equal to a preset duration, the drive motor is activated.

In one example, the ratio of the component of the thrust received by the gripping portion along the preset straight line to the deformation amount of the pressure sensor along the preset straight line is greater than or equal to 150 N/mm and less than or equal to 300 N/mm.

In one example, a support member formed with a first accommodation cavity is further included, where the pressure sensor and the pressing member are disposed at least partially in the first accommodation cavity.

In one example, the support member, the pressing member, and the pressure sensor are sequentially arranged along the preset straight line.

In one example, the operation member includes a connecting arm extending along the preset straight line; and the support member includes a second accommodation cavity sleeved on the connecting arm.

In one example, the first accommodation cavity and a second accommodation cavity communicate at least partially with each other and allow the pressing member to pass through.

In one example, the pressing member includes a driving surface capable of applying pressure to the pressure sensor, and the pressure sensor includes a force-receiving surface fitting with the driving surface.

In one example, the force-receiving surface perpendicularly intersects with the preset straight line.

In one example, a plane where the driving surface is located obliquely intersects with the preset straight line.

In one example, in the case where the driving surface is in contact with the force-receiving surface, along the preset straight line, a projection of the driving surface and the force-receiving surface on a plane perpendicular to the preset straight line is a circle.

In one example, the pressure sensor includes a force-receiving surface, and the preload element causes the force-receiving surface to undergo initial deformation.

In one example, when the pressure sensor undergoes initial deformation, the pressure sensor outputs an initial signal value; and when the operation member is pulled backward, the pressure sensor outputs a signal value less than the initial signal value and the walk-behind self-propelled working machine stops.

In one example, when the pressure sensor undergoes initial deformation, the pressure sensor outputs an initial signal value; and when the operation member is pushed backward, the pressure sensor outputs a signal value greater than the initial signal value and the walk-behind self-propelled working machine starts to move by itself.

In one example, in the case where the gripping portion receives the thrust, a signal value outputted by the pressure sensor changes with the thrust, where the signal value includes a value within a first interval and a value within a second interval; and the deformation amount of the pressure sensor when the pressure sensor outputs the value within the first interval is less than the deformation amount of the pressure sensor when the pressure sensor outputs the value within the second interval. In the case where the preload element applies the preload force to the pressure sensor, an initial signal value is the value within the second interval.

In one example, values within the first interval are distributed nonlinearly and values within the second interval are distributed linearly.

In one example, the preload element is configured to be an elastic member.

In one example, the preload element is disposed on an upper side of the pressure sensor.

In one example, the preload element is disposed on a lower side of the pressure sensor.

In one example, a preset thrust value is set or stored for the walk-behind self-propelled working machine; and the walk-behind self-propelled working machine further includes a conversion module configured to obtain a desired rotational speed according to the thrust sensed by the sensing device and the preset thrust value; and a control module configured to control the rotational speed of the drive motor to change toward the desired rotational speed.

In one example, a preset module is further included, where the preset thrust value is stored in the preset module and configured to be a fixed value.

In one example, the preset thrust value is configured to be greater than or equal to 10 N and less than or equal to 60 N.

In one example, the preset thrust value is configured to be greater than or equal to 20 N and less than or equal to 30 N.

In one example, the control module is configured to drive the drive motor to accelerate from a current actual rotational speed to the desired rotational speed at a varying acceleration.

In one example, the control module is configured to drive the drive motor to decelerate from a current actual rotational speed to the desired rotational speed at a varying acceleration.

In one example, an adjustment process of the conversion module may be configured to be a proportional-integral-derivative (PID) adjustment process; where the PID adjustment process includes subtracting the preset thrust value from a value of the thrust sensed by the sensing device to obtain a difference and performing proportional, integral, and derivative operations on the difference to obtain the desired rotational speed.

In one example, a duration between when the sensing device senses a current pressure value and when the sensing device performs sensing next time is set to 0.04 s.

In one example, a control module is further included and configured to control the drive motor to stop in the case where the thrust sensed by the sensing device remains less than or equal to a first preset value for a preset duration.

In one example, a preset module is further included, configured to set or store the first preset value and the preset duration and further configured to set or store a preset thrust value.

In one example, a conversion module is further included and configured to obtain a desired rotational speed according to the thrust sensed by the sensing device and a preset thrust value and output the desired rotational speed in the case where a value of the thrust is less than or equal to the first preset value.

In one example, in the case where a duration of the thrust sensed by the sensing device is less than the preset duration, the control module obtains a desired rotational speed.

In one example, in the case where a duration of the thrust sensed by the sensing device is greater than the preset duration, a signal of a rotational speed obtained by the control module is 0.

In one example, a preset module and a correction module are further included, where the preset module is configured to store a normal distribution of an initial output signal of the sensing device; and the correction module is configured to correct the initial output signal in the case where the initial output signal of the sensing device does not conform to the normal distribution.

In one example, the sensing device includes two pressure sensors (left and right pressure sensors) disposed on the handle device, where in the case where the handle device is under no pressure, the two pressure sensors (the left and right pressure sensors) generate two sets of initial elements through random rules, and statistical parameter estimation is performed on the two sets of initial elements so that two sets of means and standard deviations are obtained and thus two normal distributions are obtained.

In one example, in the case where the pressure sensor senses pressure, the sensing device filters collected values and obtains filtered values, a parameter value is obtained after the filtered values are averaged, whether the parameter value conforms to the normal distribution is determined, in the case where the parameter value conforms to the normal distribution, the current parameter value is discarded, and in the case where the parameter value does not conform to the normal distribution, the initial output signal is corrected.

In one example, the correction module includes a creep calibration rule for determining whether a current parameter value satisfies that $(a21-\mu)<1.1\times 3\sigma$, where a21 denotes the current parameter value, $\mu$ denotes a mathematical expectation of the normal distribution, and $\sigma$ denotes a standard deviation of the normal distribution.

In one example, in the case where the parameter value satisfies the creep calibration rule, initial elements in the preset module are updated, where the parameter value replaces one of the initial elements so that a new normal distribution is obtained.

In one example, a speed regulation switch is further included and used for the user to operate to adjust a moving speed at which the walk-behind self-propelled working machine moves on a ground; where the walk-behind self-propelled working machine has an adaptive mode and a manual speed regulation mode, where in the case where the walk-behind self-propelled working machine is in the adaptive mode, the moving speed of the walk-behind self-propelled working machine is capable of automatically adapting to a moving speed of the user pushing the walk-behind self-propelled working machine; and in the case where the walk-behind self-propelled working machine is in the manual speed regulation mode, the moving speed of the walk-behind self-propelled working machine is controlled by the speed regulation switch.

In one example, the operation switch is further included, disposed on the handle device, and configured to control the walk-behind self-propelled working machine to switch between the adaptive mode and the manual speed regulation mode.

In one example, the operation switch includes a signal receiving member, where when the signal receiving member receives a switching signal, the operation switch controls the walk-behind self-propelled working machine to perform mode switching.

In one example, the switching signal includes a wireless signal or a wired signal.

In one example, the switching signal is configured to be inputted through a smart voice or a mobile phone client.

In one example, the operation switch is configured to be a toggle switch.

In one example, the operation switch is configured to be a control panel.

In one example, the speed regulation switch is capable of moving between a first position and a second position relative to the handle device; and a rotational speed of the drive motor in the case where the speed regulation switch is at the first position is greater than a rotational speed of the drive motor in the case where the speed regulation switch is at the second position.

In one example, a walk-behind self-propelled working machine includes a main body, an operation switch, and a handle device. The main body includes a moving assembly and a drive motor configured to drive the moving assembly. The operation switch is connected to the drive motor. The handle device is connected to the main body and includes an operation member, a connecting rod, and a sensing device. The operation member includes a gripping portion for a user to hold. The connecting rod is connected to the main body. The sensing device is configured to sense a thrust that is applied to the handle device to drive the walk-behind self-propelled working machine and further includes a pressure sensor and a pressing member. The pressure sensor is disposed between the operation member and the connecting rod. When the gripping portion receives the thrust, the pressing member applies a force along a preset straight line to the pressure sensor to drive the pressure sensor to deform. A ratio of a component of the thrust received by the gripping portion along the preset straight line to a deformation amount of the pressure sensor along the preset straight line is greater than or equal to 40 N/mm.

In one example, the ratio of the component of the thrust received by the gripping portion along the preset straight line to the deformation amount of the pressure sensor along the preset straight line is greater than or equal to 150 N/mm and less than or equal to 300 N/mm.

In one example, a support member formed with a first accommodation cavity is further included, where the pressure sensor and the pressing member are disposed at least partially in the first accommodation cavity.

In one example, the support member, the pressing member, and the pressure sensor are sequentially arranged along the preset straight line.

In one example, the operation member includes a connecting arm extending along the preset straight line; and the support member includes a second accommodation cavity sleeved on the connecting arm.

In one example, the first accommodation cavity and a second accommodation cavity communicate at least partially with each other and allow the pressing member to pass through.

In one example, the pressing member includes a driving surface capable of applying pressure to the pressure sensor, and the pressure sensor includes a force-receiving surface fitting with the driving surface.

In one example, the force-receiving surface perpendicularly intersects with the preset straight line.

In one example, a plane where the driving surface is located obliquely intersects with the preset straight line.

In one example, in the case where the driving surface is in contact with the force-receiving surface, along the preset straight line, a projection of the driving surface and the force-receiving surface on a plane perpendicular to the preset straight line is a circle.

In one example, the handle device includes a support member configured to support the pressing member, where the support member is formed with an accommodation cavity, the operation member at least partially extends into the accommodation cavity, and a gap exists between a sidewall of the accommodation cavity and an outer surface of a part of the operation member extending into the accommodation cavity.

In one example, the accommodation cavity includes a first length extending along a left-and-right direction and a second length extending along an up-and-down direction, where the first length is greater than the second length.

In one example, a difference between the first length and the second length is greater than or equal to 1 mm and less than or equal to 10 mm.

In one example, the support member extends along the preset straight line, and along the preset straight line, a projection of the accommodation cavity on a first plane perpendicular to the preset straight line is an ellipse.

In one example, the support member extends along the preset straight line; along the preset straight line, a projection of the accommodation cavity on a first plane perpendicular to the preset straight line has a first area; and along the preset straight line, a projection of the part of the operation member extending into the accommodation cavity on the first plane has a second area; where a ratio of the first area to the second area is greater than or equal to 1 and less than or equal to 3.

In one example, a rail portion is formed around an inner wall of the support member, and in the case where the operation member at least partially extends into the accommodation cavity, the operation member is at least partially in contact with the inner wall of the support member along an up-and-down direction.

In one example, the handle device includes a support member configured to support the pressing member, where a gap exists between the support member and the operation member.

In one example, the support member is formed with an accommodation cavity, the operation member at least partially extends into the accommodation cavity, and the accommodation cavity includes a first length extending along a left-and-right direction and a second length extending along an up-and-down direction, where the first length is greater than the second length, and a difference between the first length and the second length is greater than or equal to 1 mm and less than or equal to 10 mm.

In one example, the support member is formed with an accommodation cavity, the operation member at least partially extends into the accommodation cavity, and the support member extends along the preset straight line; along the preset straight line, a projection of the accommodation cavity on a first plane perpendicular to the preset straight line has a first area; and along the preset straight line, a projection of a part of the operation member extending into the accommodation cavity on the first plane has a second area; where a ratio of the first area to the second area is greater than or equal to 1 and less than or equal to 3.

In one example, the handle device includes a support member fixedly connected to or integrally formed with the connecting rod and configured to support the pressing member, where a gap exists between the support member and the operation member.

In one example, the pressing member includes a driving surface that is in contact with the pressure sensor to apply pressure along the preset straight line to the pressure sensor; where a section of the driving surface in a plane parallel to the preset straight line includes a section line, and a straight line where a line connecting two points on the section line is located obliquely intersects with the preset straight line.

In one example, an intermediate member is further included and configured to connect the pressing member to the operation member, where the intermediate member includes a first connecting hole for connecting the pressing member.

In one example, the pressing member includes a first end and a second end, the first end is formed with a second connecting hole fitting with the first connecting hole, and the second end is formed with a limiting portion and a triggering end, where the limiting portion fits with a first accommodation cavity and is configured to prevent the pressing member from being disengaged from the first accommodation cavity, and the triggering end is formed with a driving surface.

In one example, a support member is further formed with a third connecting hole fitting with the first connecting hole and the second connecting hole, a connecting pin passes through the first connecting hole, the second connecting hole, and the third connecting hole at the same time so as to connect the support member, the intermediate member, and the pressing member at the same time, and the connecting pin passes through the first connecting hole and has an interference fit with the first connecting hole.

In one example, the triggering end is in a shape of a truncated cone.

In one example, the pressure sensor is formed with a force-receiving surface fitting with the driving surface, and the force-receiving surface is formed with a through hole through which at least part of the triggering end passes.

In one example, a support member further includes a second accommodation cavity for accommodating at least part of the operation member, the first accommodation cavity and the second accommodation cavity communicate at least partially with each other, and an end of the pressing member farther from the driving surface is disposed at least partially in the second accommodation cavity.

In one example, a package configured to close at least part of the first accommodation cavity and formed with or connected to a support portion is further included, where the support portion fits with the pressure sensor and is configured to support at least part of the pressure sensor.

In one example, the sensor includes a force-receiving surface that is in contact with the pressing member to receive pressure along the preset straight line; where a section of the force-receiving surface in a plane parallel to the preset straight line includes a section line, and a straight line where a line connecting two points on the section line is located obliquely intersects with the preset straight line.

In one example, a walk-behind self-propelled working machine includes a main body, an operation switch, and a handle device. The main body includes a moving assembly and a drive motor configured to drive the moving assembly. The operation switch is connected to the drive motor. The handle device is connected to the main body and includes an operation member, a connecting rod, and a sensing device. The operation member includes a gripping portion for a user to hold. The connecting rod is configured to connect the operation member to the main body. The sensing device is configured to sense a thrust that is applied to the handle device to drive the walk-behind self-propelled working machine and further includes a pressure sensor and a pressing member. The pressure sensor is disposed between the operation member and the connecting rod. In the case where the gripping portion receives the thrust, an output signal of the pressure sensor changes with the thrust. The pressing member is configured to transmit the thrust received by the gripping portion to the pressure sensor, where the pressing member includes a driving surface that is in contact with the pressure sensor to apply pressure along a first straight line to the pressure sensor. A section of the driving surface in a plane parallel to the first straight line includes a section line, a straight line where a line connecting two points on the section line is located obliquely intersects with the first straight line, and the operation switch is capable of generating a control signal according to the thrust sensed by the pressure sensor to control a rotational speed of the drive motor.

In one example, a support member is further included, disposed between the operation member and the connecting rod, and formed with a first accommodation cavity, where the pressing member and a sensor assembly are disposed at least partially in the first accommodation cavity.

In one example, an intermediate member is further included and configured to connect the pressing member to the operation member, where the intermediate member includes a first connecting hole for connecting the pressing member.

In one example, the pressing member includes a first end and a second end, the first end is formed with a second connecting hole fitting with the first connecting hole, and the second end is formed with a limiting portion and a triggering end, where the limiting portion fits with a first accommodation cavity and is configured to prevent the pressing member from being disengaged from the first accommodation cavity, and the triggering end is formed with a driving surface.

In one example, a support member is further formed with a third connecting hole fitting with the first connecting hole and the second connecting hole, a connecting pin passes through the first connecting hole, the second connecting hole, and the third connecting hole at the same time so as to connect the support member, the intermediate member, and the pressing member at the same time, and the connecting pin passes through the first connecting hole and has an interference fit with the first connecting hole.

In one example, the triggering end is in a shape of a truncated cone.

In one example, the sensor is a pressure sensor, the pressure sensor is formed with a force-receiving surface fitting with the driving surface, and the force-receiving surface is formed with a through hole through which at least part of the triggering end passes.

In one example, a support member further includes a second accommodation cavity for accommodating at least part of the operation member, the first accommodation cavity and the second accommodation cavity communicate at least partially with each other, and an end of the pressing member farther from the driving surface is disposed at least partially in the second accommodation cavity.

In one example, a package configured to close at least part of the first accommodation cavity and formed with or connected to a support portion is further included, where the support portion fits with the sensor and is configured to support at least part of the sensor.

In one example, a walk-behind self-propelled working machine includes a main body, an operation switch, and a handle device. The main body includes a moving assembly and a drive motor configured to drive the moving assembly. The operation switch is connected to the drive motor. The handle device is connected to the main body and includes an operation member, a connecting rod, and a sensing device. The operation member includes a gripping portion for a user to hold. The connecting rod is configured to connect the operation member to the main body. The sensing device is configured to sense a thrust that is applied to the handle device to drive the walk-behind self-propelled working machine and further includes a pressure sensor and a pressing member. The pressure sensor is disposed between the operation member and the connecting rod. In the case where the gripping portion receives the thrust, an output signal of the pressure sensor changes with the thrust. The pressing member is configured to transmit the thrust received by the gripping portion to the pressure sensor. The pressure sensor includes a force-receiving surface that is in contact with the pressing member to receive pressure along a first straight line, where a section of the force-receiving surface in a plane parallel to the first straight line includes a section line, and a straight line where a line connecting two points on the section line is located obliquely intersects with the first straight line; and the operation switch is capable of generating a control signal according to the thrust sensed by the pressure sensor to control a rotational speed of the drive motor.

The pressure sensor is disposed between the operation member and the connecting rod and a thrust of the user is sensed in real time so that a self-moving speed of a lawn mower can adapt to the moving speed of the user.

DETAILED DESCRIPTION

Figure 1:
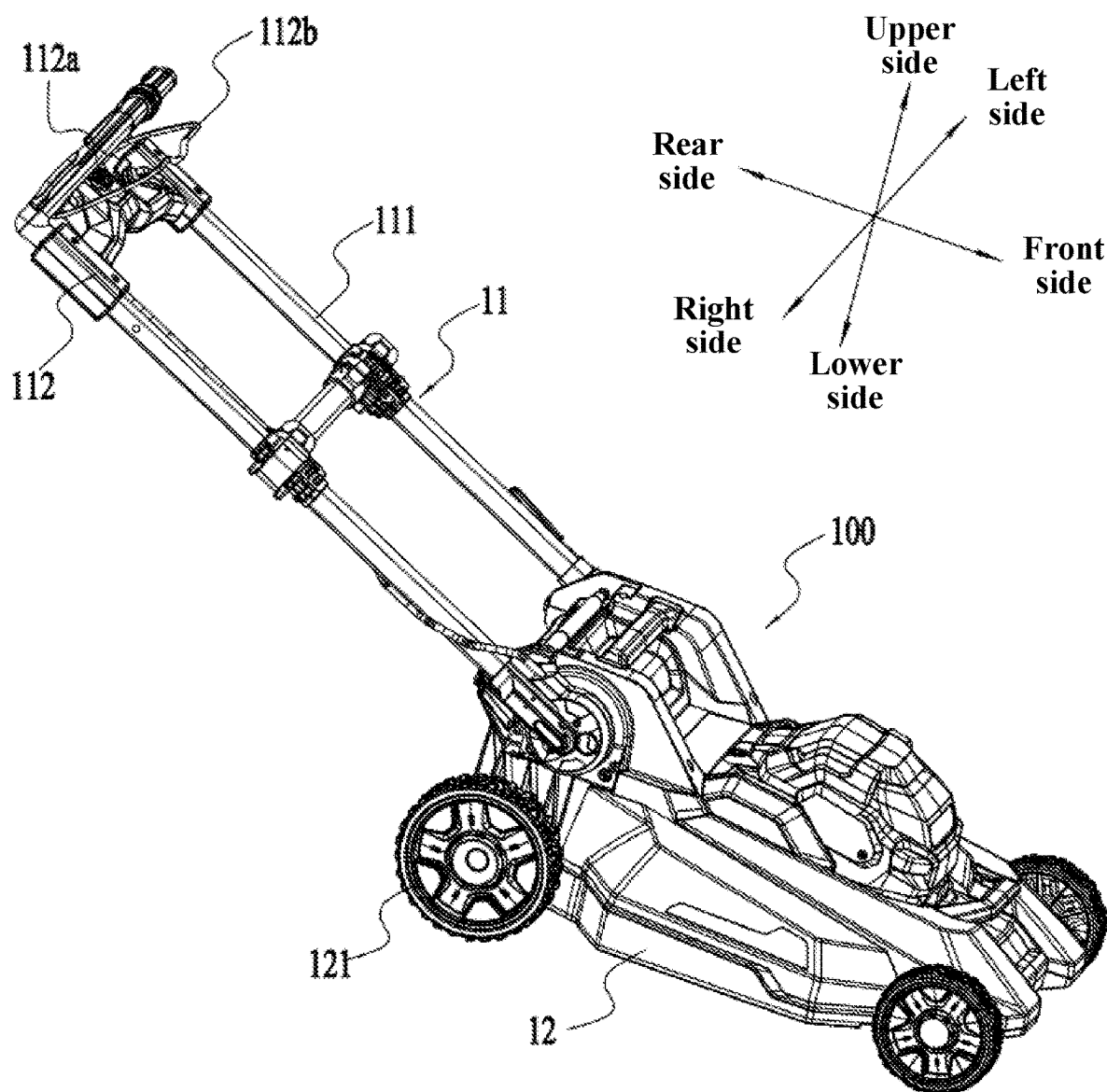
FIG. 1 is a perspective view of a walk-behind self-propelled working machine.
Figure 2:
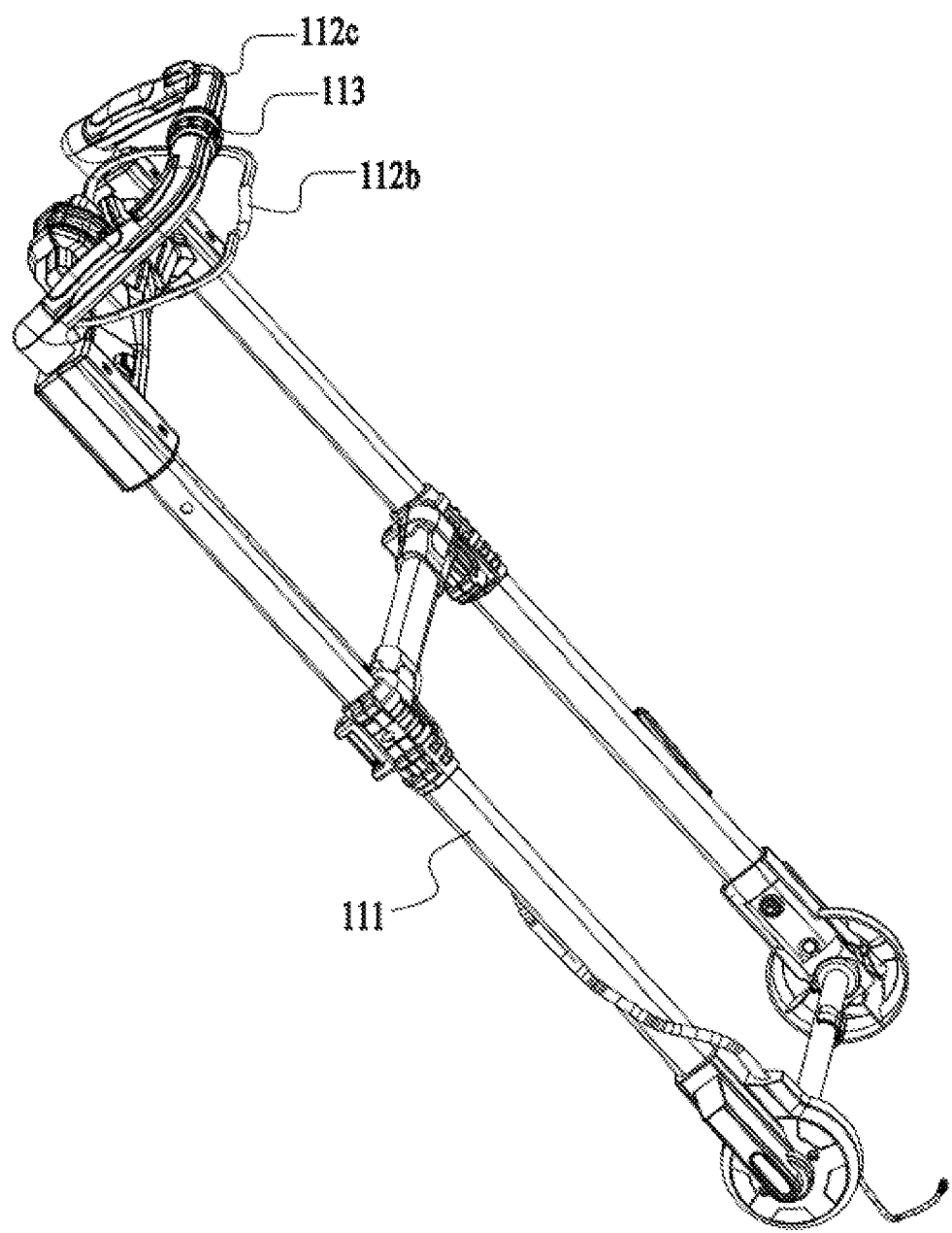
FIG. 2 is a perspective view of a handle device of the walk-behind self-propelled working machine in FIG. 1.
Figure 3:
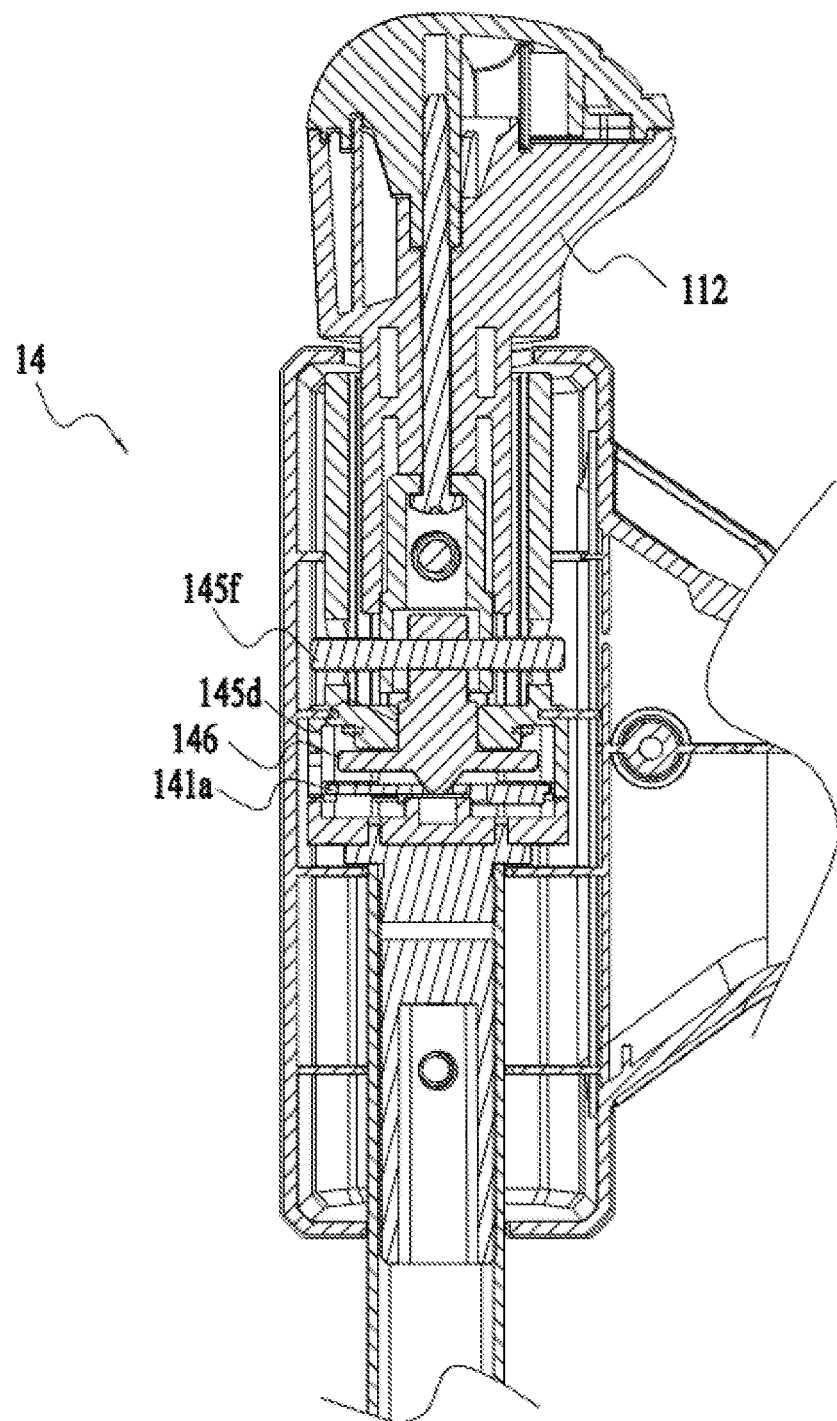
FIG. 3 is a sectional view of part of a structure of a handle device of the walk-behind self-propelled working machine in FIG. 1.
Figure 4:
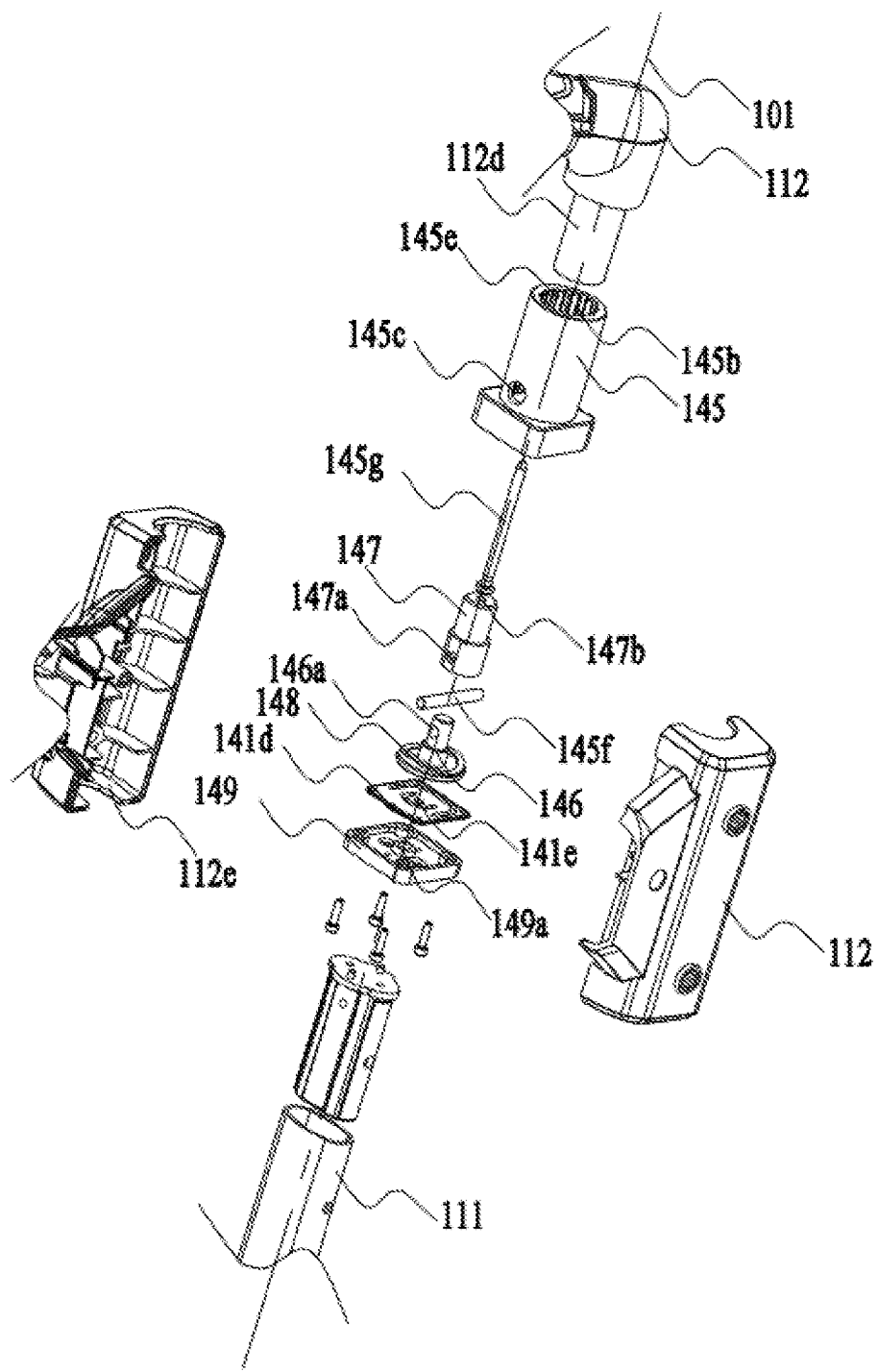
FIG. 4 is an exploded view of part of a structure of a handle device of the walk-behind self-propelled working machine in FIG. 1.
Figure 5:
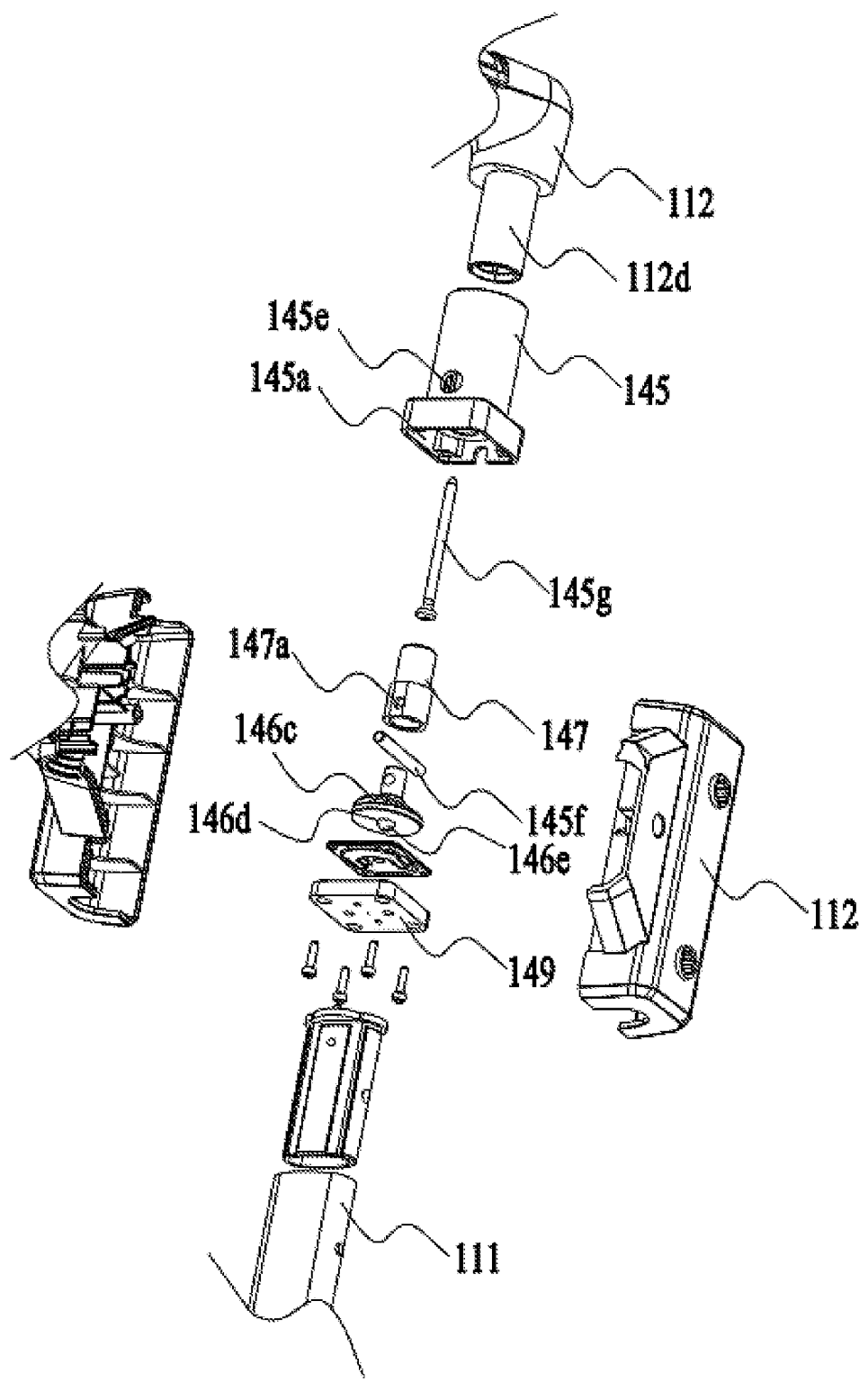
FIG. 5 is an exploded view of part of the structure of the handle device of the walk-behind self-propelled working machine in FIG. 4 from another angle.

FIG. 1 illustrates a walk-behind self-propelled working machine which may be a lawn mower, a snow thrower, a trolley, or other self-propelled working machines. As an optional example, the lawn mower is used. As shown in FIG. 1, a lawn mower 100 mainly includes a handle device 11 and a main body 12. The main body 12 includes a moving assembly 121 and a power mechanism. In one example, the lawn mower 100 is a hand-propelled lawn mower 100. The handle device 11 is connected to the main body 12 and used for a user to operate the lawn mower 100 on a rear side of the lawn mower 100. Other walk-behind self-propelled working machines such as the snow thrower and the trolley may also include components such as the handle device 11, the main body 12, and the moving assembly 121. As shown in FIG. 2, the handle device 11 includes a connecting rod 111 and an operation member 112 that can be held. The operation member includes a gripping portion for the user to hold; the connecting rod 111 is a hollow long rod structure, and the connecting rod 111 connects the operation member 112 to the main body 12. The moving assembly 121 is installed on the main body 12 and can rotate around a rotation axis so that the entire lawn mower 100 can move on the ground.

To achieve a convenient operation and an effort-saving effect, the lawn mower 100 in this example also has a self-moving function. The power mechanism can drive the moving assembly 121 to rotate so as to drive the lawn mower 100 to move on the ground, so that the user does not need to manually push the lawn mower 100 to move. The power mechanism may be a drive motor 122 which can output a driving force for driving the moving assembly 121 to rotate. In one example, the user needs to operate a control switch separately to enable or disable the self-moving function. In fact, in some examples, a power button 112*a*, a trigger 112*b*, and an operation switch 112*c* of the lawn mower 100 are all integrated on the handle device 11. Exemplarily, the power button 112*a*, the trigger 112*b*, and the operation switch 112*c* of the lawn mower 100 are all integrated on the operation member 112. In addition, the operation switch 112*c* is not limited to a physical switch or a signal switch, and any device that can control a current in a circuit to be on or off is applicable. In fact, this type of operation switch 112*c* is not limited to current control and may also control the self-moving function to be enabled or disabled by mechanical means. To increase the convenience of a user operation, this example provides the lawn mower 100 which is convenient to operate and can automatically determine its self-moving speed according to a moving speed of the user and determine and control itself to be in a self-moving state or not according to an operation state of the user, that is, an adaptive mode is provided. This example further provides a manual speed regulation mode. Exemplarily, the lawn mower 100 includes a speed regulation switch disposed on the handle device 11 and used by the user to adjust a moving speed at which the walk-behind self-propelled working machine moves on the ground. The operation switch 112*c* is further included, which is disposed on the handle device and configured to control the walk-behind self-propelled working machine to switch between the adaptive mode and the manual speed regulation mode. The operation switch 112*c* includes a signal receiving member, where when the signal receiving member receives a switching signal, the signal receiving member controls the walk-behind self-propelled working machine to perform mode switching. The switching signal includes a wireless signal or a wired signal. The switching signal is configured to be inputted through a smart voice or a mobile phone client. The operation switch 112*c* may also be configured to be a toggle switch or a control panel.

As shown in FIGS. 1 and 2, to clearly illustrate the technical solution of the present application, a front side, a rear side, a left side, a right side, an upper side, and a lower side shown in FIG. 1 are further defined. As a specific structure, the handle device 11 and the main body 12 form an active connection. Exemplarily, the handle device 11 and the main body 12 are rotatably connected and may be locked at a preset angle by a locking member. When operating the lawn mower 100 for a mowing operation, the user needs to push the lawn mower 100 to move. According to variables such as an amount of grass on the lawn and road conditions, the user needs to manually adjust the moving speed of pushing the lawn mower instead of mowing the grass mechanically according to the self-moving speed outputted by the lawn mower 100. If the user only controls the lawn mower 100 to move forward and cannot control the self-moving speed of the lawn mower 100 according to an actual situation, or the control of the self-moving speed of the lawn mower 100 requires a series of operations, the operating experience of the lawn mower 100 is greatly reduced. If complicated operations are involved, emergencies cannot be coped with, resulting in certain safety risks. As an implementation manner, the lawn mower 100 can automatically adjust the self-moving speed according to the moving speed of the user and can automatically cut off the power output of the drive motor 122 when the user stops moving forward. In one example, a sensing device 14 is disposed between the operation member 112 and the main body 12. The sensing device 14 may be specifically disposed on the main body 12 or may be disposed at a position where the operation member 112 and the main body 12 are connected or at any position between the operation member 112 and the main body 12. In this example, the sensing device 14 is disposed between the operation member 112 and the connecting rod 111. The sensing device 14 can output an electrical signal by sensing a thrust from the operation member 112. In fact, the sensing device 14 outputs a different electrical signal in response to a different thrust from the operation member 112.

As shown in FIGS. 2 to 5, the operation member 112 is formed with an accommodation space 112*e*, and the sensing device 14 is disposed in the accommodation space 112*e*. The sensing device 14 includes a support member 145, a pressing member 146, and a sensor assembly 141. The support member 145 is formed with a first accommodation cavity 145*a*, and the pressing member 146 and the sensor assembly 141 are disposed at least partially in the first accommodation cavity 145*a*. The pressing member 146 may be operated to trigger the sensor assembly 141 so that the sensor assembly 141 can output an electrical signal. The sensor assembly 141 includes two pressure sensors 141*a* that are respectively disposed on left and right sides of the support member 145 and can feed back pressure values through strain and convert the pressure values into the electrical signals for calculation or to issue an indication signal. Within an interval where the sensing device 14 is located, an extension direction of the connecting rod 111 may be defined as a preset straight line 101, and the support member 145, the pressing member 146 and the sensor assembly 141 are sequentially arranged along the preset straight line 101. The sensing device 14 further includes an intermediate member 147 and a package 149. The intermediate member 147 is configured to connect the pressing member 146 to the operation member 112, and the package 149 is configured to close at least part of the first accommodation cavity 145*a* so that the pressing member 146 and the sensor assembly 141 can be fixed in the first accommodation cavity 145*a*. The operation member 112 further includes a connecting arm 112*d* formed along the preset straight line 101. The support member 145 further includes a second accommodation cavity 145*b* sleeved on the connecting arm 112*d*, the first accommodation cavity 145*a* and the second accommodation cavity 145*b* communicate at least partially with each other and allow the pressing member 146 to pass through. In one example, the intermediate member 147 is formed with a through hole, and the pressing member 146 is disposed at least partially in the through hole and connected to the intermediate member 147 through a first connecting member 145*f* The intermediate member 147 is formed with a first connecting hole 147*a* for connecting the pressing member 146, and the pressing member 146 is formed with a second connecting hole 146*a* fitting with the first connecting hole 147*a*. The intermediate member 147 and the pressing member 146 are connected through the first connecting member 145*f* passing through the first connecting hole 147*a* and the second connecting hole 146*a*.

In fact, the support member 145 is further formed with a third connecting hole 145*c* fitting with the first connecting hole 147*a* and the second connecting hole 146*a*, that is, the first connecting member 145*f* passes through the first connecting hole 147*a*, the second connecting hole 146*a*, and the third connecting hole 145*c* at the same time. When the first connecting member 145*f* passes through the first connecting hole 147a, the first connecting member 145f has an interference fit with the first connecting hole 147a so that the intermediate member 147 will not be displaced along the preset straight line 101. A diameter of the second connecting hole 146a is greater than an outer diameter of the first connecting member 145f. In this manner, when the pressing member 146 is connected to the intermediate member 147, the pressing member 146 and the intermediate member 147 may rotate relative to each other so that a force from the operation member 112 can be transmitted to the pressing member 146 and thus the pressing member 146 can press the sensor assembly 141, thereby deforming the sensor assembly 141. A ratio of a component of the thrust received by the gripping portion along the preset straight line 101 to a deformation amount of the pressure sensor 141a along the preset straight line 101 is greater than or equal to 40 N/mm and less than or equal to 1200 N/mm. Exemplarily, the ratio of the component of the thrust received by the gripping portion along the preset straight line 101 to the deformation amount of the pressure sensor 141a along the preset straight line 101 is greater than or equal to 150 N/mm and less than or equal to 300 N/mm. In this manner, the pressure sensor 141a can identify pressure more easily and output a more accurate pressure value. In one example, the intermediate member 147 further includes a fourth connecting hole 147b through which a second connecting member 145g can pass, and the fourth connecting hole 147b allows the second connecting member 145g to pass through so as to connect the intermediate member 147 to the connecting arm 112d. The connecting arm 112d is formed with a fifth connecting hole for the second connecting member 145g to be connected. When the second connecting member 145g is configured to be a screw, the fifth connecting hole is configured to be a screw hole fitting with the screw. In fact, the intermediate member 147 may also be connected to the connecting arm 112d in other manners, which are not repeated herein. As an implementation manner, the support member 145 may be provided as a separate part in the accommodation space 112e, or may be fixedly connected to or integrally formed with the connecting rod 111. When the support member 145 is configured to be fixedly connected to or integrally formed with the connecting rod 111, the connecting rod 111 is configured in two halves so that a sensor, the pressing member 146 and the like can be installed therein.

The pressing member 146 further includes a main body extending basically along the preset straight line 101, where a first end of the main body is formed with the preceding second connecting hole 146a, and a second end of the main body is formed with a limiting portion 146c and a triggering end 146d. The limiting portion 146c is configured to fit with the support member 145 to prevent the pressing member 146 from being disengaged from the support member 145. At the same time, the pressing member 146 is connected to the connecting arm 112d through the intermediate member 147. Therefore, when the limiting portion 146c fits with the support member 145, since a through hole 145d at a position where the first accommodation cavity 145a and the second accommodation cavity 145b of the support member 145 communicate with each other allows only the main body of the pressing member 146 to pass through and the limiting portion 146c disposed at one end of the main body cannot pass through the through hole 145d, the support member 145 is limited by the limiting portion 146c and basically generates no relative displacement with the connecting arm 112d. In one example, the sensing device 14 further includes a preload element 148, where the preload element 148 is disposed on a side of the limiting portion 146c facing away from the triggering end 146d. When the sensor assembly 141 and the pressing member 146 are disposed in the first accommodation cavity 145a and packaged by the package 149, the preload element 148 disposed between the limiting portion 146c and the support member 145 can provide a preload force. A signal value acquired by the sensor assembly 141 due to deformation is of a relatively small order of magnitude, and the signal value acquired by the sensor assembly 141 is generated through the deformation of the pressure sensor 141a. Within a preset interval, the pressure sensor 141a might be incapable of learning data, or even if the pressure sensor 141a learns data, the pressure sensor 141a cannot determine the accuracy of transmitted data, that is, signal values outputted by the pressure sensor 141a include values within a first interval and values within a second interval. The values within the first interval are composed of discrete data or nonlinear data and have a nonlinear relationship. The values within the second interval are data learnt after the pressure sensor 141a is compressed to a certain interval and have a linear relationship. The values within the first interval can be filtered out by a system only through complicated operations, and due to the nonlinear relationship of the data within the first interval, the entire system might perform inaccurate operations. The preload element 148 is provided to preload the pressure sensor 141a so that the values within the first interval can be directly and effectively filtered, and thus the pressure sensor 141a can output values that include a zero point value and have the linear relationship. In this manner, the system calculates data more conveniently and can obtain zero point data without multiple calibrations, thereby reducing a computing load of the system. The preceding preload element 148 is actually disposed on an upper side of the pressure sensor 141a. As another implementation manner, the preload element 148 may be disposed on a lower side of the pressure sensor 141a and can achieve basically the same effects as the preceding preload element 148 disposed on the upper side of the pressure sensor 141a, which are not repeated herein. The preload element 148 may be a pressure spring or other elastic members with elasticity, each of which can produce basically linear elastic deformation when receiving a force and return to an original position after the force is withdrawn.

The triggering end 146d further includes a driving surface 146e fitting with the sensor assembly 141 to apply pressure to the sensor assembly 141. The sensor assembly 141 further includes a force-receiving surface 141d that is in contact with the driving surface 146e to receive the pressure. A section of driving surface 146e in a plane parallel to the preset straight line 101 includes a section line, and a straight line where a line connecting two points on the section line is located obliquely intersects with the preset straight line 101. In fact, a plane where the driving surface 146e is located also obliquely intersects with the preset straight line 101. Therefore, when the driving surface 146e is pressed against the force-receiving surface 141d and the driving surface 146e is in contact with the force-receiving surface 141d, a projection of a contact surface between the driving surface 146e and the force-receiving surface 141d along the preset straight line 101 is still a circular plane, which can ensure that the pressure sensor 141a accurately learns a current pressure value and avoids a relatively complicated operation process. In fact, the triggering end 146d is configured to be a truncated cone, and the sensor assembly 141 is provided with a through hole 141e through which the truncated cone can at least partially pass, where a plane where the through hole 141e is located is the force-receiving surface 141d; and a side surface of the truncated cone is the driving surface 146e. In this example, the package 149 is further formed with or connected to a support portion 149a, where the support portion 149a is configured to fit with the sensor assembly 141 to support at least part of the sensor assembly 141 so that the following case is avoided: the sensor assembly 141 deforms too much and fails under the action of the pressing member 146. As another implementation manner, a section of the force-receiving surface 141d in the plane parallel to the preset straight line 101 includes a section line, and a straight line where a line connecting two points on the section line is located obliquely intersects with the preset straight line 101. In this case, the driving surface 146e is configured to be a plane surface, which can also achieve the following effect: when the driving surface 146e is in contact with the force-receiving surface 141d, the projection of the contact surface between the driving surface 146e and the force-receiving surface 141d along the preset straight line 101 is still the circular plane, which ensures that the pressure sensor 141a accurately learns the current pressure value and avoids the relatively complicated operation process.

A projection of a position of the support member 145 where the second accommodation cavity 145b is located on a first plane perpendicular to the preset straight line 101 includes a first length extending along a left-and-right direction and a second length extending along an up-and-down direction. The first length is greater than or equal to the second length. In one example, the first length is greater than the second length, and a difference obtained through subtraction of the second length from the first length is greater than or equal to 1 mm and less than or equal to 10 mm. In this manner, the connecting arm 112d and the operation member 112 are limited to a certain extent in the up-and-down direction and can shake to a certain extent in the left-and-right direction so that the following case is avoided: the support member 145 and the connecting arm 112d are stuck due to a friction therebetween, or the force cannot be effectively transmitted due to the friction. In one example, a projection of the second accommodation cavity 145b on the first plane is an ellipse. A major axis of the ellipse is arranged along the left-and-right direction and a minor axis of the ellipse is arranged along a front-and-rear direction. Exemplarily, along the preset straight line 101, the projection of the second accommodation cavity 145b of the support member 145 on the first plane has a first area, and a projection of the connecting arm 112d on the first plane has a second area. The first area is greater than the second area, and a ratio of the first area to the second area is greater than or equal to 1 and less than or equal to 3. In this manner, on the one hand, it is ensured that the connecting arm 112d can be effectively inserted into the second accommodation cavity 145b; and on the other hand, it is ensured that an inner wall of the second accommodation cavity 145b can at least partially limit the connecting arm 112d to avoid shaking between the operation member 112 and the support member 145 along the up-and-down direction when the operation member 112 is operated.

In addition, along the preset straight line 101, a rail portion 145e is formed around the inner wall of the second accommodation cavity 145b of the support member 145, that is, the inner wall of the second accommodation cavity 145b is not a continuous elliptic curve but is provided with bumps or grooves basically distributed uniformly so that when the connecting arm 112d is inserted into the second accommodation cavity 145b, a contact surface between the support member 145 and the connecting arm 112d is relatively small, a gap can be generated between the support member 145 and the connecting arm 112d, and thus a friction between the support member 145 and the connecting arm 112d is relatively small. In this example, a fixing member fitting with the package 149 is further included, where the fixing member may be fixed to the connecting rod 111 and fit with a housing of the operation member 112 to form the accommodation space 112e that can close and press the sensing device 14.

Figure 6:
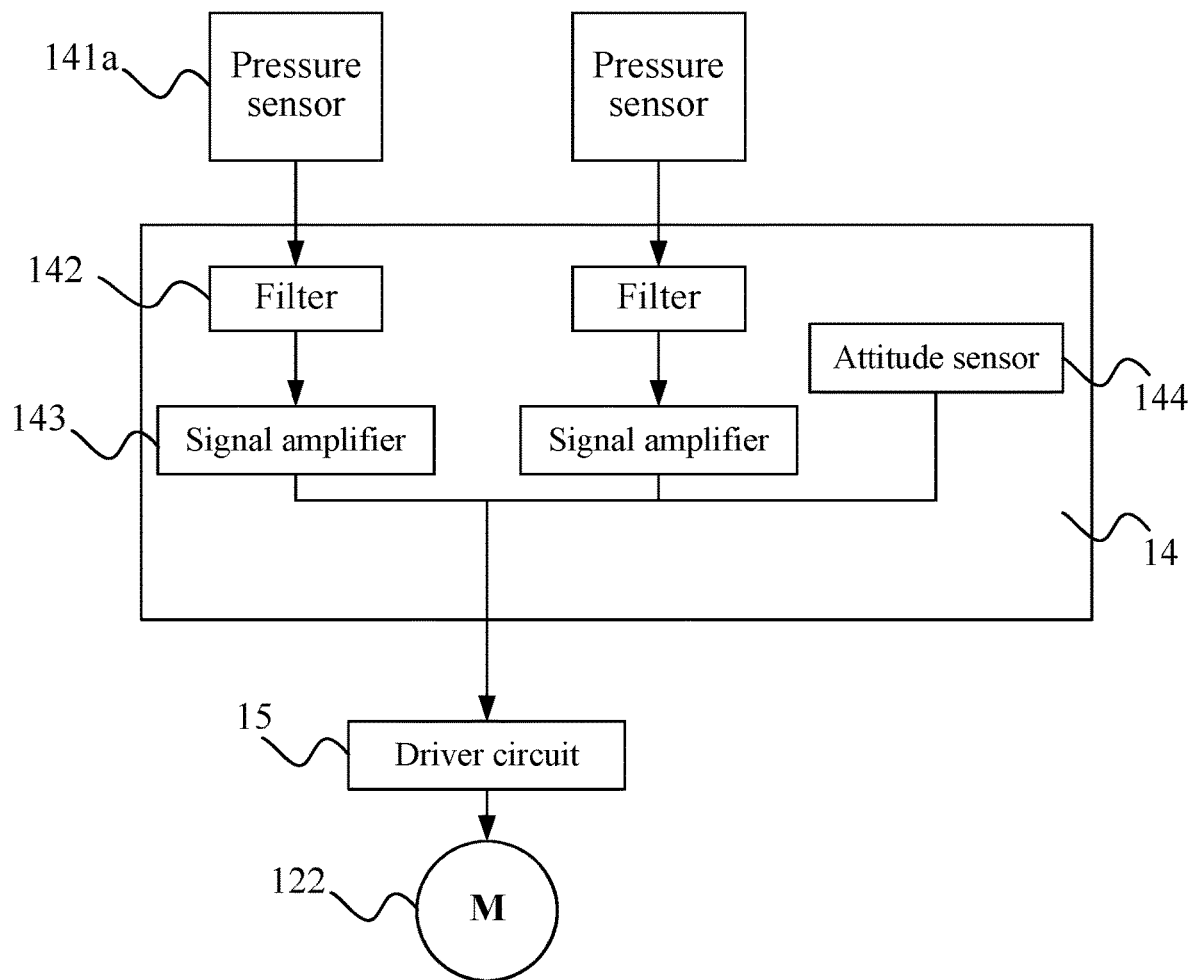
FIG. 6 is a logic control diagram illustrating that a sensing device of the walk-behind self-propelled working machine in FIG. 1 receives signals.
Figure 7:
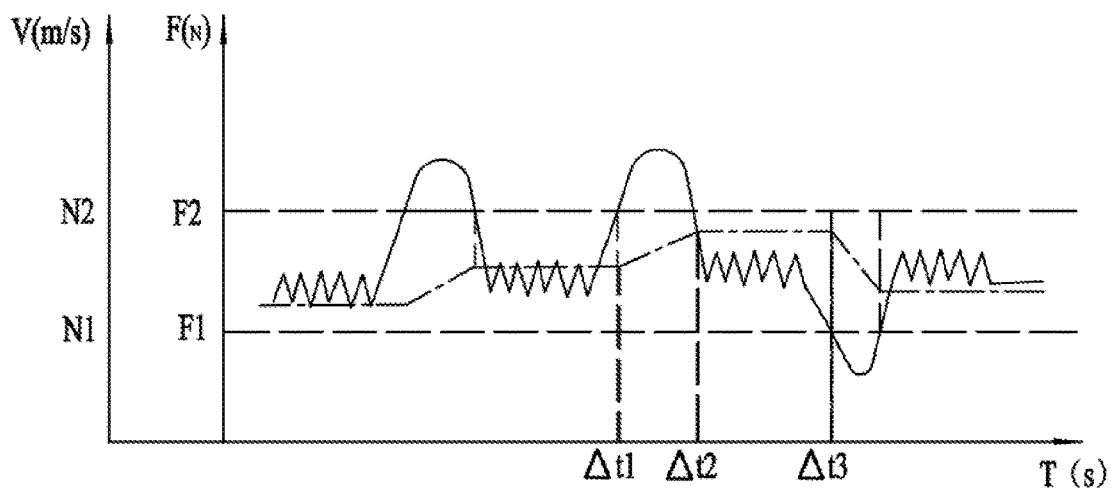
FIG. 7 is a trend chart illustrating relationships between a speed of and a thrust on the walk-behind self-propelled working machine in FIG. 1 and time.

As shown in FIGS. 6 and 7, in this example, when the user operates the operation member 112, the sensing device 14 senses a force applied by the user to the operation member 112 and provides an electrical signal for determination. In one example, the sensing device 14 further includes a filter 142 and a signal amplifier 143. The sensor assembly 141 is configured to receive the pressure from the operation member 112 and output an electrical signal, the filter 142 is configured to filter the electrical signal outputted by the sensor assembly 141, and the signal amplifier 143 is configured to amplify the electrical signal filtered by the filter 142 to obtain the electrical signal for determination.

Due to various factors such as user habits and different operation conditions, a single sensor sometimes cannot accurately reflect a magnitude of pressure actually applied to the machine. To increase the sensitivity and accuracy of the sensor assembly 141 for receiving a pressure signal, the sensor assembly 141 may further include a first sensor and a second sensor. The first sensor and the second sensor are respectively disposed at two positions where the operation member 112 and the connecting rod 111 are connected. The first sensor is disposed at a left connection position of the operation member 112 and the connecting rod 111, and the second sensor is disposed at a right connection position of the operation member 112 and the connecting rod 111, where the left connection position and the right connection position may be located at the same position in a horizontal or vertical direction or at different positions in the horizontal or vertical direction. In fact, since the first sensor and the second sensor are installed at different positions and might be affected by the operation of the user, a difference between a first signal and a second signal inputted to the sensing device is relatively large, and the sensing device needs to superimpose signal values from the first sensor and the second sensor. In addition, in an actual operation process, the first signal inputted to the sensing device and the second signal inputted to the sensing device need to be calibrated, for example, weighted using different coefficients so that a total force inputted by the user can be accurately identified, thereby effectively avoiding erroneous determination when a single sensor is touched. On the other hand, the following case can be effectively avoided: the user who is accustomed to using the right hand or the left hand applies an unbalanced force on the operation member 112 and thus erroneous determination occurs. As another optional implementation manner, the sensor assembly 141 may also include only one sensor. A relatively smart sensor is disposed so that a signal is identified according to the operation of the user and a signal is outputted so as to control the self-moving function of the lawn mower 100. In one example, the preceding sensor may be disposed on a side of the operation member 112 and the connecting rod 111 or disposed at a position where the connecting rod 111 and the main body 12 are connected and can generate a signal for output through changes of the force applied to the connecting rod 111 or the main body 12 and the displacement, so as to control the self-moving function of the lawn mower 100 through the signal. In this example, the first sensor and the second sensor are specifically two identical pressure sensors 141a. The pressure sensors 141a may be contact pressure sensors or contactless pressure sensors.

In one example, when the triggering end 146d is in contact with the force-receiving surface 141d, the force-receiving surface 141d produces a certain amount of elastic deformation, and the amount of deformation is converted into an electrical signal for output. Due to different pressure received, the pressure sensor 141a may output a voltage signal proportional to the pressure and obtain a value of the thrust applied to a handle by the user according to the voltage signal so that the drive motor 122 is controlled to accelerate. When the user pushes the handle with different forces, the operation member 112 displaces at a level of a millimeter or less relative to the connecting rod 111 at the connection position, and the pressure sensor senses positive voltage signals substantially proportional to values of thrusts from the user so that a magnitude of a speed at which the drive motor 122 operates forward is controlled. It is to be noted that a distance between the force-receiving surface 141d of the pressure sensor 141a and the triggering end 146d of the lawn mower 100 at their initial positions is about 1 mm to 10 mm so that the appearance of the whole machine does not change at the position where the operation member 112 and the connecting rod 111 of the lawn mower 100 are connected, the relative displacement between the operation member 112 and the connecting rod 111 is relatively small, it is not easy for the user to notice that the operation member 112 and the connecting rod 111 of the lawn mower 100 are detachably connected or movably connected, and the whole machine has good user experience.

After the force-receiving surface 141d is triggered by the triggering end 146d, the amount of deformation of the pressure sensor 141a is of a relatively small order of magnitude, so a relatively weak electrical signal is outputted in such manner that the deformation is sensed. At this time, the electrical signal is amplified through a signal amplification circuit disposed in the handle device 11. In fact, before the pressure sensor 141a transmits the signal and the electrical signal is amplified, the electrical signal needs to be filtered. The electrical signal outputted by the pressure sensor 141a has noise clutter, where the clutter generally includes high-frequency and small-amplitude noise signals, abnormal pressure signals caused by accidental touch, and the like. In one example, a pre-filtering part is connected in the subsequent circuit connected to the pressure sensor 141a, a capacitor with a relatively small capacitance eliminates high-frequency noise, and a capacitor with a relatively large capacitance eliminates low-frequency noise. After the signal outputted by the pressure sensor 141a is filtered and amplified, a basically stable signal is outputted for determination.

The sensing device 14 further includes an attitude sensor 144, where the attitude sensor 144 is configured to collect spatial position signals of the lawn mower 100 and output a three-dimensional attitude and azimuth signal. In a process of operating the lawn mower 100 to mow the grass, when the lawn mower 100 needs to turn around, the user generally needs to lift a head of the lawn mower 100 and use rear wheels as a fulcrum to make it more convenient to turn around. In fact, the lawn mower 100 is still in operation during the process of turning the lawn mower 100 around, and the user is generally unaware of actively operating a control switch on the operation member 112 to shut down the lawn mower 100 so that the lawn mower 100 at this time has certain potential safety risks. The attitude sensor 144 is installed so that after detecting that the lawn mower 100 is lifted and has the tendency to turn around, the attitude sensor 144 outputs a signal to the sensing device 14, and the sensing device 14 outputs a stop signal so as to control the lawn mower 100 to brake or stop.

After receiving various signals, the sensing device 14 performs preliminary processing and can further output an electrical signal for determination, and the electrical signal is further transmitted to a driver circuit 15. The driver circuit 15 controls the drive motor 122 according to the signal transmitted from the sensing device 14. In one example, when the user turns on the operation switch 112c and pushes the lawn mower 100 to move forward, the thrust applied by the user to the operation member 112 has a relatively large value. At this time, the pressure sensor 141a transmits a relatively large electrical signal, and the sensing device 14 performs preliminary processing on the signal, that is, pressure signals from two pressure sensors 141a are filtered, amplified, and combined, and then transmitted to the driver circuit 15, and the driver circuit 15 controls, according to the electrical signal, the drive motor 122 to output a relatively large torque. When the user needs to decelerate according to an operation situation, the value of the thrust applied by the user to the operation member 112 becomes smaller, and the pressure sensor 141a transmits a relatively small electrical signal. After the signal is processed by the sensing device 14, the signal is then transmitted to the driver circuit 15, and the driver circuit 15 controls, according to the electrical signal, the drive motor 122 to output a relatively small torque. When the user does not touch the operation member 112 or is away from the operation member 112, the pressure sensor 141a no longer outputs an electrical signal, and the driver circuit 15 controls, according to a change in value of the electrical signal in the circuit, the self-moving drive motor 122 to stop rotating, so as to stop the lawn mower 100.

A rotational speed of the drive motor 122 is basically positively correlated to the moving speed of the user pushing the lawn mower 100. That is, when the moving speed of the user increases, the rotational speed of the self-moving drive motor 122 increases; when the moving speed of the user decreases, the rotational speed of the self-moving drive motor 122 decreases. When the circuit fluctuates or the electrical signal is unstable, a proportional relationship between the rotational speed of the drive motor 122 and the moving speed of the user is outside the preceding positive correlation, and the proportional relationship between the rotational speed of the drive motor 122 and the moving speed of the user is also considered as falling into the preceding positive correlation. A magnitude of the electrical signal outputted by the sensor assembly and an output torque of the self-moving drive motor 122 also form the positive correlation. When the accuracy of the sensing device 14 and the driver circuit 15 reaches a relatively high level, the rotational speed of the self-moving drive motor 122 may be positively proportional to the moving speed of the user.

When the user needs to lift the head of the lawn mower 100 and turn the lawn mower 100 around, the attitude sensor 144 detects the situation and outputs an electrical signal. The electrical signal is transmitted to the driver circuit 15 and the driver circuit 15 performs determination and controls the self-moving drive motor 122 of the lawn mower 100 to stop. When the user finishes turning the lawn mower 100 around and lays down the lawn mower 100, the driver circuit 15 of the lawn mower 100 is on and can enable the self-moving function and adjust the self-moving speed according to the moving speed of the user.

As another implementation manner, the walk-behind self-propelled working machine further has a constant speed mode. The lawn mower 100 is used as an example. In this example, a driving manner of the lawn mower 100 can make it more convenient for the user to operate the lawn mower 100. In one example, as shown in FIGS. 6 and 7, when the user presses the operation switch 112c and the self-moving function of the lawn mower 100 is enabled, the lawn mower 100 enters a soft start stage in which the self-moving drive motor 122 provides the lawn mower 100 with an acceleration and the lawn mower 100 instantly enters a moving state from a stop state. Exemplarily, the soft start stage is very short, during which only the acceleration is provided to change the state of the lawn mower 100. When the user presses the operation switch 112c and pushes the lawn mower to move, the soft start stage has been completed and the lawn mower 100 enters the self-moving state. At this time, the lawn mower 100 controls the rotational speed or torque of the self-moving drive motor 122 according to the moving speed of the user, so as to control the self-moving speed. When the lawn mower 100 is pushed by the user, the pressure from the operation member 112 is received by the sensor assembly 141, and the lawn mower 100 is controlled to accelerate. When the user moves into a constant speed state adapted to the moving speed of the user and keeps outputting relatively stable pressure to the operation member 112 of the lawn mower 100, the lawn mower 100 enters a constant speed state adapted to the moving speed of the user.

As shown in FIG. 7, the lawn mower 100 is in the constant speed state within a preset pressure range. In one example, when the pressure received by the sensor assembly 141 is greater than or equal to F1 and less than or equal to F2, the lawn mower 100 enters the constant speed state adapted to the moving speed of the user according to a moving state of the user. Exemplarily, when the pressure received by the sensor assembly 141 is greater than or equal to F1 and less than or equal to F2, the moving speed of the lawn mower 100 is not positively correlated to the received force. When the user pushes the lawn mower 100 to move forward at a relatively fast speed, the sensor assembly 141 drives, according to the received force, the lawn mower 100 to move forward at the relatively fast speed. When the moving speed of the lawn mower 100 is synchronized with the moving speed of the user, the force applied by the user to the operation member 112 starts to decrease. However, since the user still needs to output part of the force to the operation member 112 to hold the operation member 112, the force transmitted to the sensor assembly 141 is reduced to a value between F1 and F2, and the sensing device 14 controls, according to a change of the force, the current moving speed of the lawn mower 100 to be constant. When different users push the lawn mower 100 to move forward and move at constant speeds which are different, the force applied by the user to the operation member 112 gradually decreases and falls between F1 and F2 when the user and the lawn mower 100 are moving at a constant speed, and the lawn mower 100 enters a constant speed state, where a speed at this time is the same as a moving speed at the previous moment. At this time, the user no longer needs to push the lawn mower 100 to move forward and only needs to place hands on the operation member 112 to follow the lawn mower 100 to move at a constant speed.

In addition, when the force transmitted to the sensor assembly 141 is greater than F2, the lawn mower 100 enters an acceleration state until the force falls within an interval greater than or equal to F1 and less than or equal to F2 again, and the lawn mower 100 enters the constant speed state again. When the force transmitted to the sensor assembly 141 is less than F1, the lawn mower 100 enters a deceleration state from the constant speed state. When the force transmitted to the sensor assembly 141 decreases to 0, the lawn mower 100 stops operating. F1 and F2 defined here do not limit a maximum moving speed and a minimum moving speed of the user. The user adjusts the relative movement with the lawn mower 100 according to the moving speed of the user, and when the force transmitted to the sensor assembly 141 falls between F1 and F2, the user keeps moving in a constant speed state at a speed the same as the speed at the previous moment. The constant speed at which the lawn mower 100 keeps moving is further limited to a speed range in which safe and effective mowing can be kept. That is, when the lawn mower 100 is operating at a high speed, the speed will not exceed a maximum speed N2 that threatens the safety of the user and is beyond the moving speed of the user; when the lawn mower 100 is operating at a low speed, the speed will not be lower than a minimum speed N1 that hinders the normal moving of the user and affects the mowing effect.

As an implementation manner, the lawn mower 100 further includes a controller, where the controller may be provided with a preset module, a conversion module, and a control module. The preset module is configured to set or store a preset thrust value. The preceding sensing device can periodically sense the value of the thrust applied to the handle device to drive the lawn mower 100. The conversion module can obtain a desired rotational speed according to the value of the thrust sensed by the sensing device and the thrust value set or stored in the preset module. The control module controls the rotational speed of the drive motor 122 to change toward the desired rotational speed.

Figure 8:
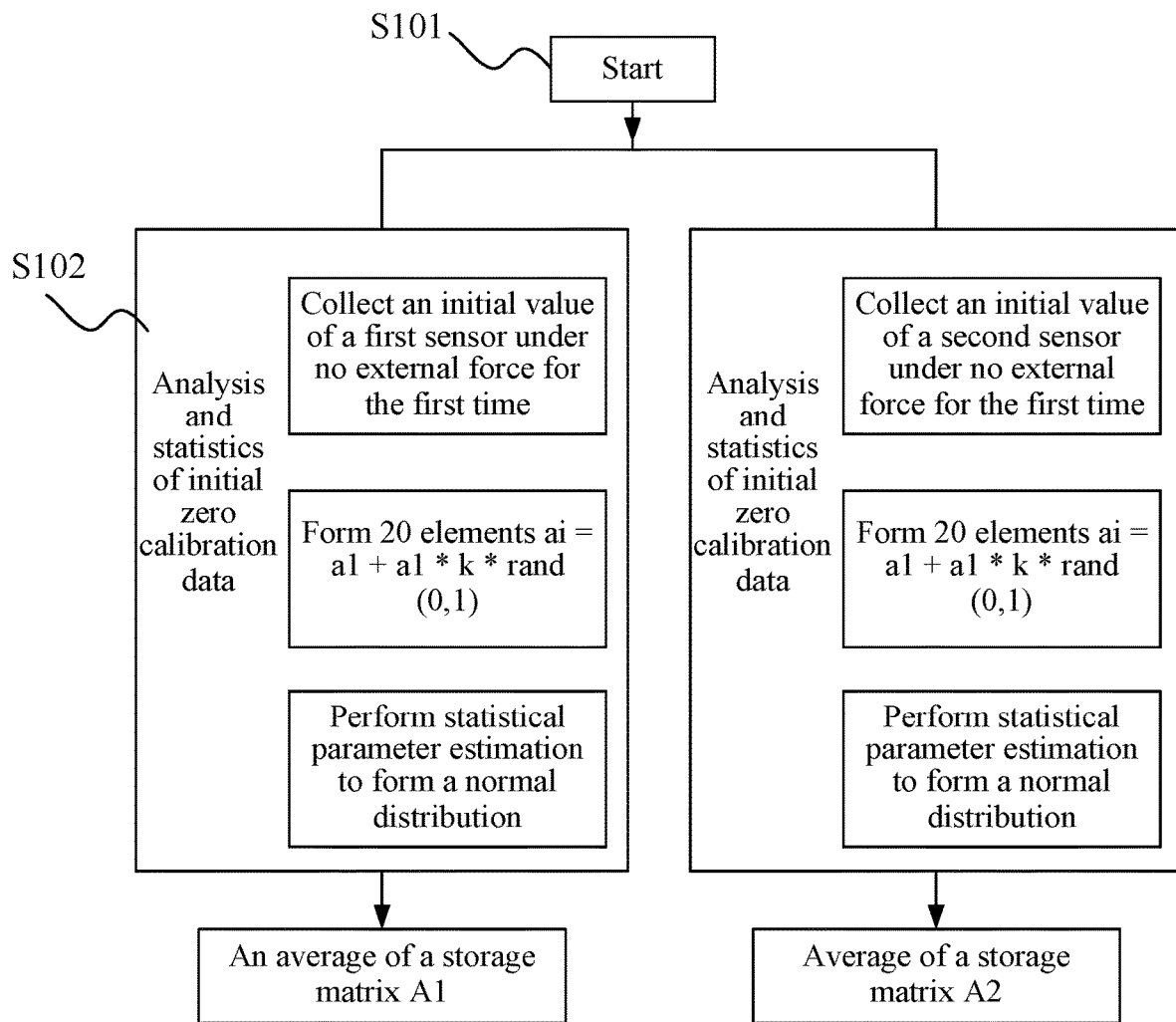
FIG. 8 is a logic control diagram illustrating that a sensing device of the walk-behind self-propelled working machine in FIG. 1 receives a signal.

In one example, as shown in FIG. 8, the preset module, as a storage system of the lawn mower 100, can store a set of data in an initialization state. Exemplarily, the preset module separately records values of electrical signals of left and right sensors under no pressure, generates 20 initial elements a1 to a20 on a left side and 20 initial elements b1 to b20 on a right side through random rules, stores a1 to a20 and b1 to b20 in the preset module, and obtains an average of a storage matrix A1 and an average of a storage matrix A2. Furthermore, two sets of averages and standard deviations are obtained through statistical parameter estimation, so as to obtain two normal distributions of the left and right sensors and initialize the system.

Figure 9:
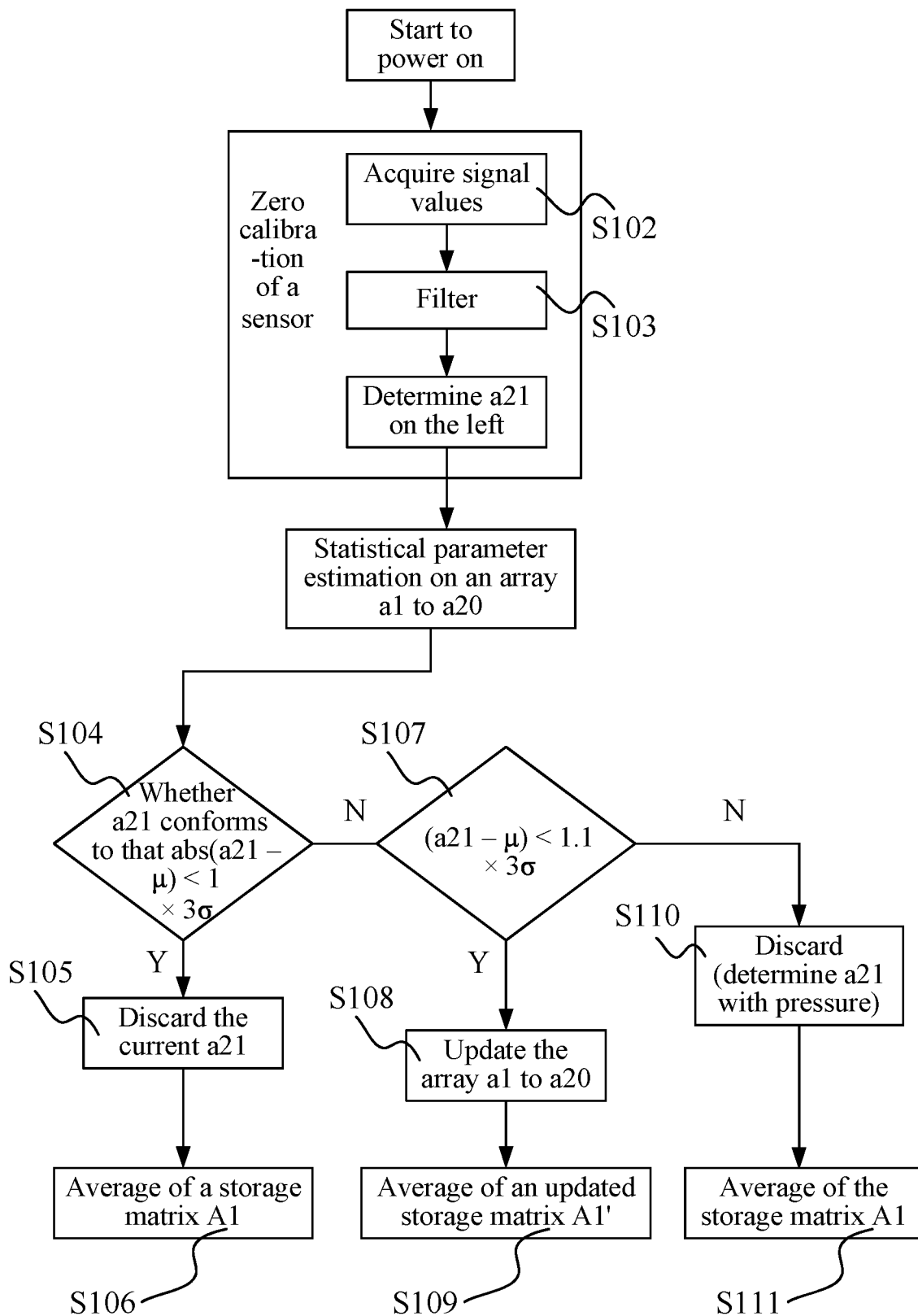
FIG. 9 is a logic control diagram of an array acquisition process of a left pressure sensor of the walk-behind self-propelled working machine in FIG. 1.
Figure 10:
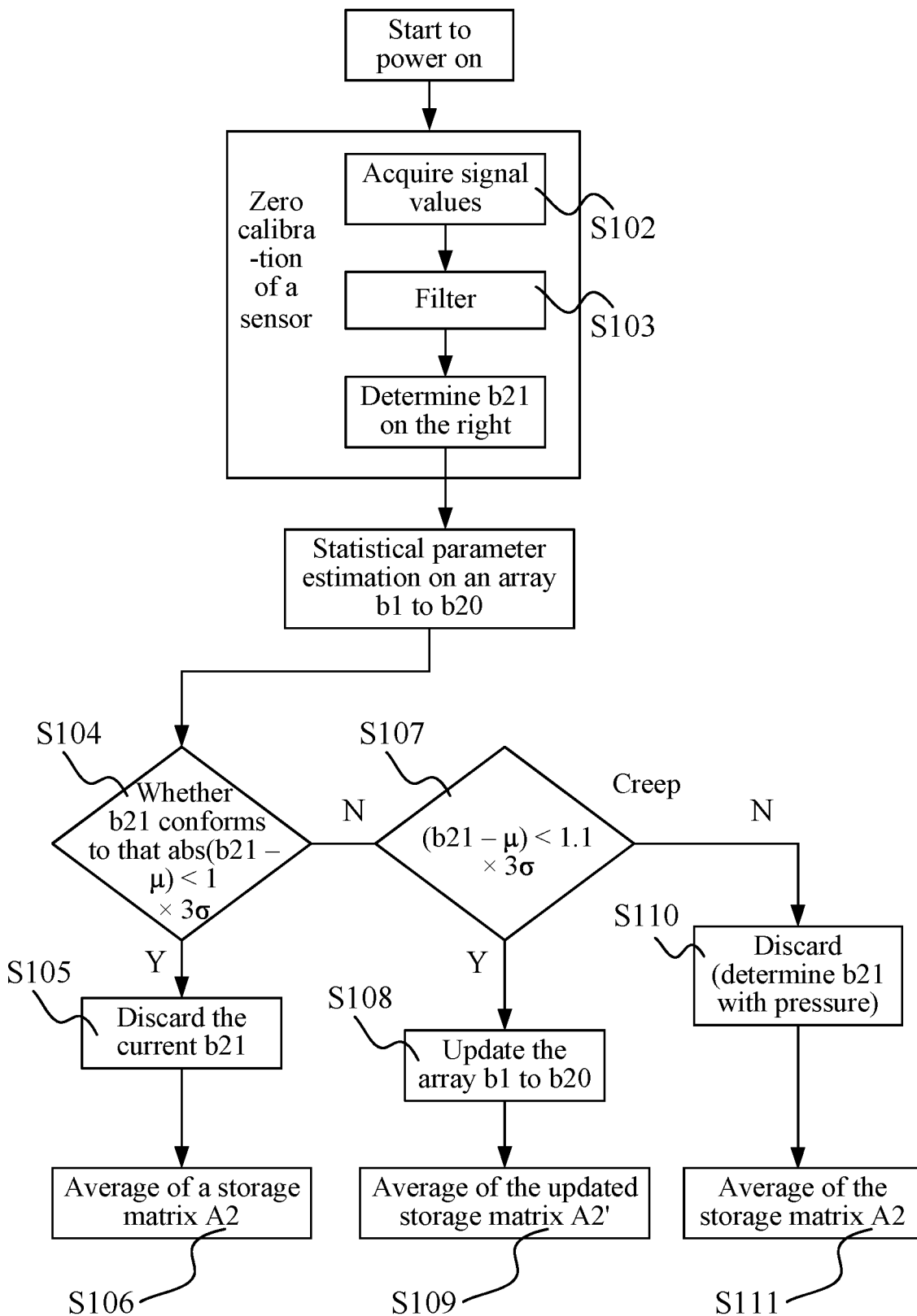
FIG. 10 is a logic control diagram of an array acquisition process of a right pressure sensor of the walk-behind self-propelled working machine in FIG. 1.
Figure 11:
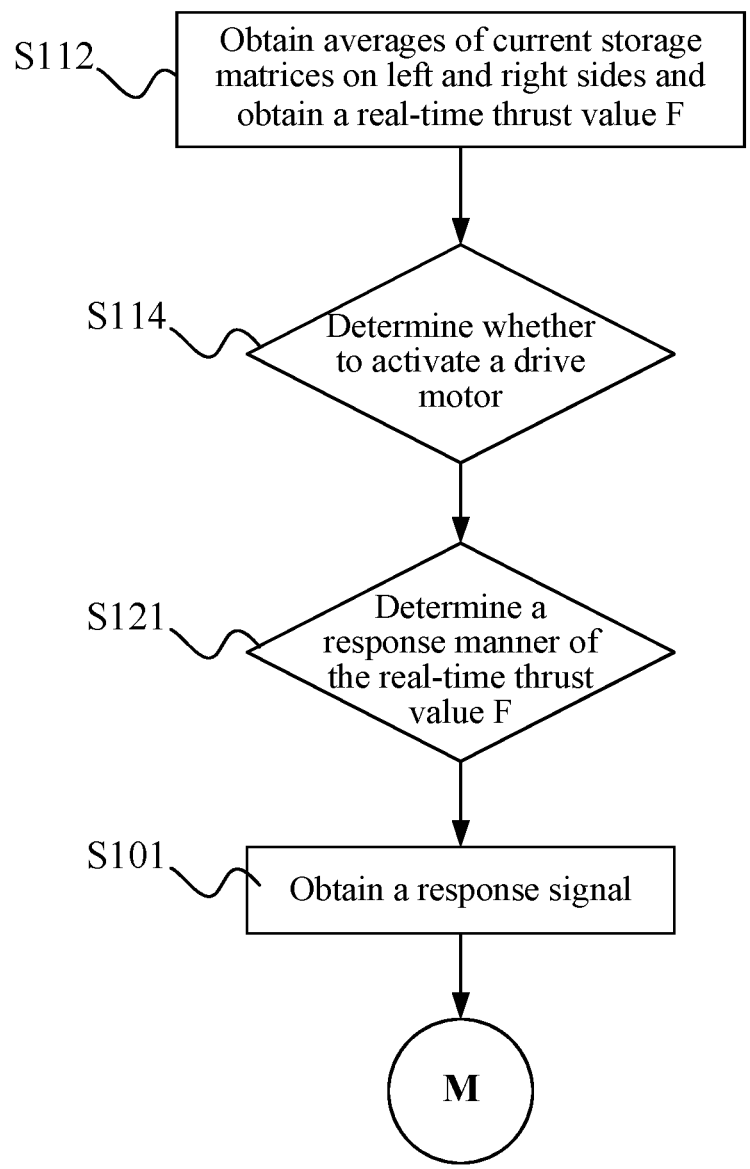
FIG. 11 is a logic control diagram of a response of a motor after a thrust value is acquired for the walk-behind self-propelled working machine in FIG. 1.
Figure 12:
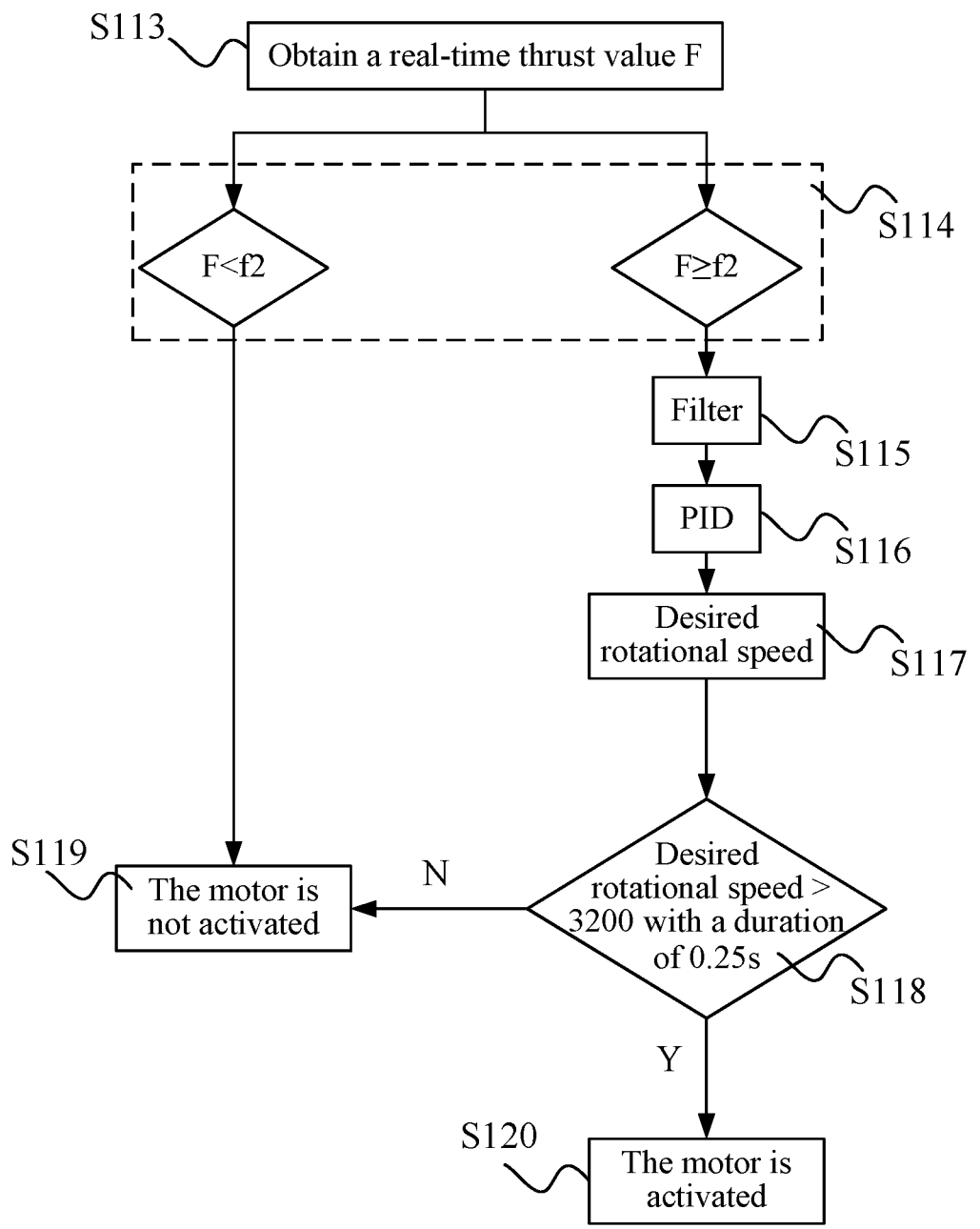
FIG. 12 is a logic control diagram for determining whether a motor is activated for the walk-behind self-propelled working machine in FIG. 1.
Figure 13:
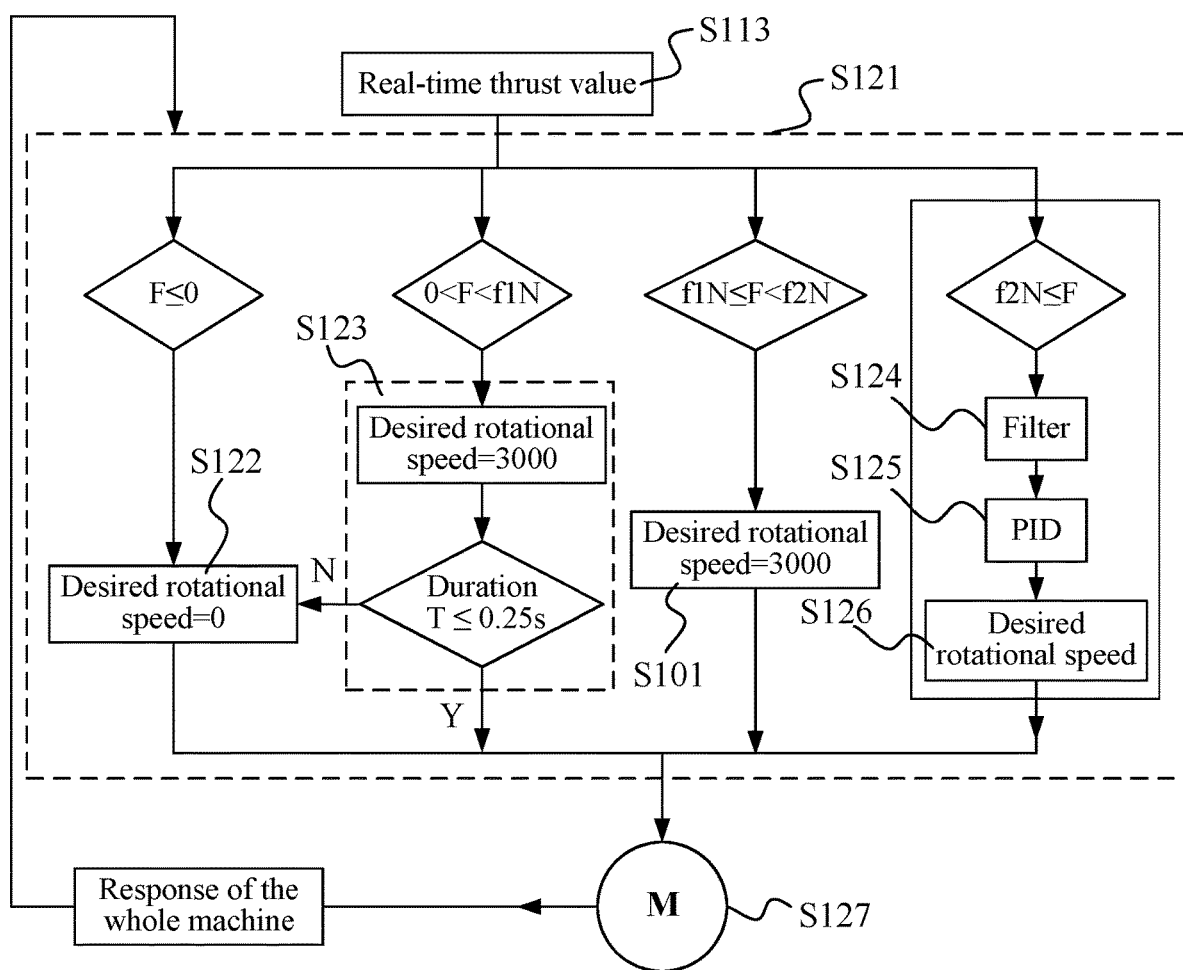
FIG. 13 is a logic control diagram for determining a response manner of a thrust for the walk-behind self-propelled working machine in FIG. 1.
Figure 14:
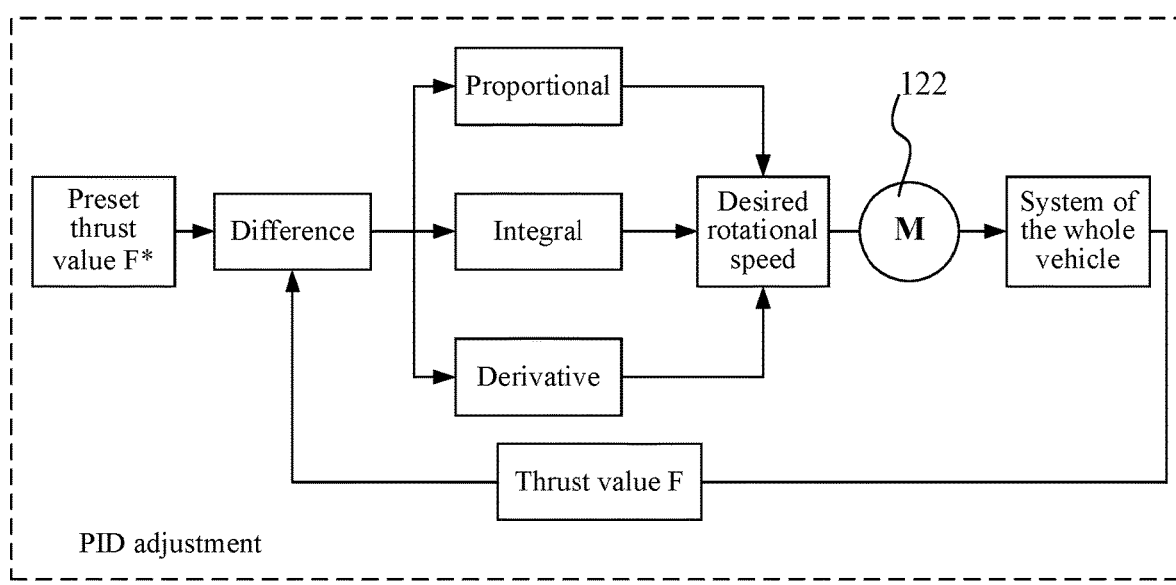
FIG. 14 is a logic control diagram of PID adjustment for the walk-behind self-propelled working machine in FIG. 1.

As shown in FIGS. 9 and 10, after the system is initialized, the lawn mower 100 can be operated normally. In one example, when the system is initialized, the left and right pressure sensors disposed on the operation member start to sense current pressure signal values as the sensing device. Here, the left pressure sensor is used as an example. When the pressure sensor senses pressure, the system filters the sensed pressure signal. After filtering, the system collects 100 filtered values and averages the 100 values to obtain a parameter a21. At this time, the normal distribution stored on the left side is called so as to determine whether the parameter a21 falls within the normal distribution. If so, the current parameter a21 is discarded, the average of the storage matrix A1 is called, and the storage matrix A1 is obtained; if not, a determination process according to a creep calibration rule starts. The lawn mower 100 further includes a correction module, where the creep calibration rule is set in the correction module, and the correction module is configured to correct a value of an initial output signal when the initial output signal sensed by the sensing device does not conform to the preceding normal distribution. In one example, the creep calibration rule is used for determining whether the current parameter a21 satisfies that (a21−μ)<1.1×3σ, where μ denotes a mathematical expectation of the normal distribution stored in the preset module, and σ denotes a standard deviation of the normal distribution stored in the preset module. When the parameter a21 satisfies the creep calibration rule, the initial elements a1 to a20 on the left side are updated to a2 to a21. The updated initial elements form an updated storage matrix A1', and the updated storage matrix A1' is averaged. Furthermore, a set of updated averages and standard deviations are obtained through statistical parameter estimation. At this time, the normal distribution stored on the left side is updated, and the system calls the average of the updated storage matrix A1' and obtains the storage matrix A1'. When the parameter a21 does not satisfy the creep calibration rule, the current parameter a21 is discarded, the average of the original storage matrix A1 is called, and the storage matrix A1 is obtained.

As shown in FIG. 10, the right pressure sensor obtains an average of a real storage matrix in the same manner. In one example, when the pressure sensor senses pressure, the system filters the sensed pressure signal. After filtering, the system collects 100 filtered values and averages the 100 values to obtain a parameter b21. At this time, the normal distribution stored on the left side is called so as to determine whether the parameter b21 falls within the normal distribution. If so, the current parameter b21 is discarded, the average of the storage matrix A2 is called, and the storage matrix A2 is obtained; if not, a determination process according to a creep calibration rule starts. In one example, the creep calibration rule is used for determining whether the current parameter b21 satisfies that (b21−μ)<1.1×3σ, where μ denotes a mathematical expectation of the normal distribution stored in the preset module, and σ denotes a standard deviation of the normal distribution stored in the preset module. When the parameter b21 satisfies the creep calibration rule, the initial elements b1 to b20 on the left side are updated to b2 to b21. The updated initial elements form an updated storage matrix A2', and the updated storage matrix A2' is averaged. Furthermore, a set of updated averages and standard deviations are obtained through statistical parameter estimation. At this time, the normal distribution stored on the left side is updated, and the system calls the average of the updated storage matrix A2' and obtains the storage matrix A2'. When the parameter b21 does not satisfy the creep calibration rule, the current parameter b21 is discarded, the average of the original storage matrix A2 is called, and the storage matrix A2 is obtained. Here, the creep calibration rule is set so that the following case can be effectively avoided: after the pressure sensor creeps, data called by the system cannot satisfy an actual accuracy requirement of the current pressure sensor. The creep calibration rule is set so that the pressure sensor can provide accurate data in real time. The averages of the real storage matrices acquired for the left and right pressure sensors are averaged so that a real-time thrust value of the pressure sensors is obtained.

As shown in FIGS. 11 to 14, as an implementation manner, the lawn mower 100 in the present application includes a low-speed driving mode and an adaptive mode. When the value of the thrust received by the sensing device is less than a first preset value f1, the lawn mower 100 is in the low-speed driving mode; when the thrust value is greater than a second preset value f2, the lawn mower 100 is in the adaptive mode. Here, the preset module is further configured to set or store a preset speed. In the case where the walk-behind self-propelled working machine is in the low-speed driving mode, the control module controls the rotational speed of the drive motor 122 to be less than or equal to a preset rotational speed; and in the case where the walk-behind self-propelled working machine is in the adaptive mode, the control module controls the rotational speed of the drive motor 122 to change toward the desired rotational speed obtained according to the thrust value, where the desired rotational speed is greater than the preset rotational speed. In one example, the first preset value f1 is less than or equal to the second preset value f2. When the first preset value f1 is equal to the second preset value f2, the walk-behind self-propelled working machine is configured to include only the low-speed driving mode and the adaptive mode. When the first preset value f1 is less than the second preset value f2, the walk-behind self-propelled working machine is configured to further include the low-speed driving mode and the adaptive mode. When the thrust value is greater than the second preset value f2, the lawn mower 100 is in the adaptive mode; when the thrust value is greater than 0 and less than f2, the lawn mower 100 is in the low-speed driving mode; where when the thrust value is greater than or equal to f1 and less than f2, the lawn mower 100 is in the low-speed driving mode, and the drive motor 122 keeps rotating at a speed less than or equal to the preset rotational speed. When the thrust value is greater than 0 and less than f1, the drive motor 122 has a tendency to keep rotating at the speed less than or equal to the preset rotational speed. The conversion module determines the rotational speed of the drive motor 122 according to a duration of the value of the thrust sensed by the sensing device. That is, when the value of the thrust sensed by the sensing device is greater than 0 and less than f1 and the duration is less than or equal to a preset duration T, the control module controls the drive motor 122 to still keep rotating at the speed less than or equal to the preset rotational speed; and when the value of the thrust sensed by the sensing device is greater than 0 and less than f1 and the duration is greater than the preset duration T, the control module controls the drive motor 122 to stop.

The above provides only a process of determining the lawn mower 100 between the low-speed driving mode and the adaptive mode. In fact, when the lawn mower 100 is operated, the value of the thrust applied to the operation member is continuously sensed by the sensing device. The sensing device continuously determines a sensed real-time thrust value according to the preceding determination process, so as to control the lawn mower 100 to adjust its own operation condition in real time according to the real-time thrust value. That is, after the drive motor 122 obtains the current rotational speed, the whole machine responds and is controlled to move at the current rotational speed. When the control module obtains the next rotational speed, the control module immediately controls the drive motor 122 to perform a response of the whole machine according to the next rotational speed. When the value of the thrust applied to the lawn mower 100 is 0, or the lawn mower 100 is pulled backward, the value of the thrust sensed by the sensing device is less than or equal to 0, and the control module controls the rotational speed of the drive motor 122 to be 0. Exemplarily, since the sensing device is provided with a pre-compression element, where the pre-compression element is in a pre-compression state so that the pressure sensor is in the pre-compression state. When the operation member of the lawn mower 100 is pulled backward, a pre-compression force applied to the pressure sensor is at least partially removed, and the pressure sensor outputs a negative value, that is, the thrust value outputted by the sensing device is less than or equal to 0.

When the lawn mower 100 moves by itself on the ground or a road with a relatively small friction, the user only needs to output a relatively small thrust value to push the lawn mower 100 to move. At this time, the value of the thrust sensed by the sensing device remains greater than 0 and less than f2, and the control module controls the drive motor 122 to keep rotating at the speed less than or equal to the preset rotational speed. The user may remain in a relatively comfortable state to push the lawn mower 100 to move. When the user needs to actively accelerate the lawn mower 100, the user quickly pushes the lawn mower 100 to move. At this time, under the action of acceleration, the force applied by the user to the operation member might be greater than or equal to f2 within a certain period of time. In this case, the conversion module can obtain the desired rotational speed according to the value of the thrust sensed by the sensing device and the thrust value set or stored in the preset module, and the control module controls the rotational speed of the drive motor 122 to change toward the desired rotational speed.

When the lawn mower 100 moves by itself on the ground or a lawn with a relatively large friction, the user needs to output a relatively large thrust value to push the lawn mower 100 to move due to the relatively large friction applied to the moving assembly 121. That is, the force applied to the operation member is greater than or equal to f2, the conversion module can obtain the desired rotational speed according to the value of the thrust sensed by the sensing device and the thrust value set or stored in the preset module, and the control module controls the rotational speed of the drive motor 122 to change toward the desired rotational speed. Exemplarily, when the value of the thrust sensed by the sensing device is greater than or equal to f2, the conversion module filters the current thrust value and then adjusts the filtered thrust value to obtain the desired rotational speed. As an implementation manner, a conversion process of the conversion module may be PID adjustment. In one example, a preset thrust value F* is set or stored in the preset module, where the preset thrust value F* may be set to a fixed value and may be configured to be selected within a preset interval. A difference between the preset thrust value F* and the thrust value obtained in real time is calculated so as to obtain a value, and proportional, integral, and derivative operations are performed on the value so as to obtain the desired rotational speed. The control module controls the motor to operate at the desired rotational speed in real time. The desired rotational speed is greater than the preset rotational speed. The preceding PID adjustment only reflects one adjustment process. In fact, when the user is operating the lawn mower 100, the sensing device continuously senses the value of the thrust applied to the operation member, and the conversion module also continuously performs conversions according to the value of the thrust. When the value of the thrust is greater than or equal to f2, the system continuously performs the PID adjustment until the moving speed of the user and the self-moving speed of the lawn mower 100 reach a dynamic balance, that is, the moving speed of the user is basically the same as the self-moving speed of the lawn mower 100. Exemplarily, in the preceding PID adjustment process, the value of the thrust sensed by the sensing device cannot reflect the real-time rotational speed of the drive motor 122 through the PID adjustment with certainty. Generally speaking, when a signal of the desired rotational speed is transmitted to the drive motor 122 and the drive motor 122 responds to the current signal to change its rotational speed, a response time difference exists, that is, the duration from when the sensing device senses the current thrust value to when the desired rotational speed is obtained through the PID adjustment is relatively short, and a speed at which the desired rotational speed is obtained and a speed at which the signal is transmitted are much greater than a response speed of the drive motor 122. However, the existence of the response time difference does not affect the operation of the lawn mower 100. To prevent the drive motor 122 from being unable to respond in time due to too fast a speed at which the desired rotational speed is acquired, the sensing device is configured to sense the current thrust value and sense the next thrust value 0.04 s later. In this process, although a duration from when the sensing device senses a current pressure value to when the conversion module completes the conversion of the current thrust value and obtains the desired rotational speed is much shorter than 0.04 s, the sensing device no longer senses the thrust value and restarts to sense a current thrust value 0.04 s later and transmits the current thrust value to the conversion module for conversion, so as to obtain a new desired rotational speed. After a series of PID adjustment processes, the moving speed of the user and the self-moving speed of the lawn mower 100 tend to be the same, and the preceding response time difference disappears immediately.

The preset rotational speed is a rotational speed preset in the system for reference, and the desired rotational speed is a rotational speed that an operator expects the drive motor 122 to reach during operation. As an implementation manner, the preceding values may be set to the following data: for example, the preset rotational speed in the preset module of the lawn mower 100 is set to 3000 r/min, the first preset value f1 is set to 10 N, and the second preset value is set to 17 N. The preset duration T is set to 0.25 s, and the preset thrust value F* may be selected within an interval greater than or equal to 10 N and less than or equal to 60 N. In one example, the preset thrust value F* may be selected within an interval greater than or equal to 20 N and less than or equal to 30 N. When the value of the thrust received by the sensing device is less than or equal to 0 N, the control module controls the rotational speed of the drive motor 122 to be 0; when the value of the thrust received by the sensing device is greater than 0 N and less than or equal to 10 N, it is determined whether the duration of the thrust value is less than or equal to 0.25 s, where when the duration is less than or equal to 0.25 s, the control module controls the drive motor 122 to rotate at a speed less than or equal to 3000 r/min, and when the duration is greater than 0.25 s, the control module controls the rotational speed of the drive motor 122 to be 0. When the value of the thrust received by the sensing device is greater than or equal to 10 N and less than or equal to 17 N, the control module controls the rotational speed of the drive motor 122 to be less than or equal to 3000 r/min. When the value of the thrust received by the sensing device is greater than or equal to 17 N, the conversion module can obtain the desired rotational speed through filtering and PID adjustment according to the value of the thrust sensed by the sensing device, and the control module controls the drive motor 122 to rotate at the desired rotational speed greater than 3000 r/min until the value of the thrust from the user is stabilized within the interval greater than or equal to 20 N and less than or equal to 30 N and the lawn mower 100 operates at a speed that allows the user to move comfortably. In one example, the preset rotational speed, f1, f2, and T are not limited to the preceding values, and only an optional example is provided here for reference.

In this example, before determining whether the lawn mower 100 enters the low-speed driving mode or the adaptive mode, the system needs to determine, according to the real-time thrust value, whether the drive motor 122 is activated. In one example, when the real-time thrust value is less than the second preset value f2 in the preset module, the motor is not activated. When the real-time thrust value is greater than or equal to the second preset value f2, the system filters the acquired real-time thrust value and then performs the PID adjustment on the filtered value to obtain a motor target value. Here, the preset module further stores a preset rotational speed for start-up. When the motor target value is greater than the preset rotational speed for start-up and a duration is greater than 0.25 s, the motor is activated and the system enters a mode determination process of the low-speed driving mode or the adaptive mode. Otherwise, the motor is not activated.

The present application further provides a method for a walk-behind self-propelled working machine. The method includes steps described below.

In S101, the lawn mower starts to be powered on. Then, S102 is performed. That is, the lawn mower 100 is connected to a power source, and a power switch is in an on stage.

In S102, electrical signals are collected. Then, S103 is performed. At this time, the sensing device disposed inside the operation member starts to collect pressure signals under the action of an external force. For example, the first sensor collects 100 electrical signals; and the second sensor collects 100 electrical signals.

In S103, filtering is performed. Then, S104 is performed. When the pressure signals are collected, the system starts to filter the collected pressure signals, that is, to filter out some noise clutter. When the filtering is completed, the system collects 100 filtered values on the left and 100 filtered values on the right, averages them, and determines a21 and b21.

In S104, whether a21 conforms to a normal distribution in an initial state is determined. If so, S105 is performed; and if not, S107 is performed.

In S105, the current value a21 is discarded. Then, S106 is performed.

In S106, the normal distribution of a storage matrix A1 in the initial state is not updated; and an average of the current storage matrix A1 on the left side is obtained.

In S107, whether the current value a21 conforms to the creep calibration rule. If so, S108 is performed; and if not, S110 is performed.

In S108, the storage matrix is updated. Then, S109 is performed.

In S109, an average of the updated storage matrix A1' is obtained.

In S110, the current value a21 is discarded. Then, S111 is performed.

In S111, the normal distribution of the storage matrix A1 in the initial state is not updated; and the average of the current storage matrix A1 on the left side is obtained.

A manner for determining b21 is the same as the manner for determining a21. The preceding determination process from S104 to S111 is the same for b21.

In S112, the average of the current storage matrix on the left side and the average of the current storage matrix on the right side are obtained. Then, S113 is performed.

In S113, a real-time thrust value F is obtained. Then, S114 is performed.

In S114, whether to activate the drive motor 122 is determined according to the real-time thrust value F. If F<f2, S119 is performed; and if F≥f2, S115 is performed.

In S115, when the thrust value F is collected, the system starts to filter the thrust value F, that is, to filter out some noise clutter. After the filtering is completed, S116 is performed.

In S116, PID conversion is performed. Then, S117 is performed.

In S117, the desired rotational speed Pre-speed of the drive motor 122 is obtained. Then, S118 is performed.

In S118, whether the desired rotational speed Pre-speed of the drive motor 122 is greater than 3200 and lasts for 0.25 s is determined. If not, S119 is performed; and if so, S120 is performed.

In S119, the drive motor 122 is not activated.

In S120, the drive motor 122 is activated. Then, S121 is performed.

In S121, a response manner of the thrust is determined according to the real-time thrust value F. If F≤0, S122 is performed; if 0<F<f1, S123 is performed; if f1<F<f2, S124 is performed; if f2≤F, S125 is performed.

In S122, the drive motor 122 outputs a rotational speed of 0. That is, the drive motor 122 is in a braking state.

In S123, the drive motor 122 outputs a rotational speed of 3000 r/min, and whether the output continues for 0.25 s is determined. If so, S122 is performed; and if not, S127 is performed.

In S124, the system starts to filter the thrust value F, that is, to filter out some noise clutter. After the filtering is completed, S125 is performed.

In S125, the PID conversion is performed. Then, S126 is performed.

In S126, the desired rotational speed Pre-speed of the drive motor 122 is obtained. Then, S127 is performed. In this case, a process in which the speed of the drive motor 122 follows the Pre-speed of the drive motor 122 exists.

In S127, the drive motor 122 responds and the whole machine responds. Then, S121 is performed.

What is claimed is:

1. A walk-behind working machine, comprising:
 a main body comprising a moving assembly and a drive motor configured to drive the moving assembly; and
 a handle device connected to the main body,
 wherein the handle device comprises:
  an operation switch connected to the drive motor;
  an operation member comprising a gripping portion for a user to grip;
  a connecting rod connected to the main body; and
  a sensing device configured to sense a thrust that is applied to the handle device to drive the walk-behind working machine,
 wherein the sensing device further comprises:
  a pressure sensor disposed between the operation member and the connecting rod; and
  a pressing member, wherein when the gripping portion receives the thrust, the pressing member applies a force along a preset straight line to the pressure sensor to drive the pressure sensor to deform; and
  a preload element configured to apply a preload force to the pressure sensor, and
 wherein the preload element causes the pressure sensor to undergo initial deformation.

2. The walk-behind working machine of claim 1, wherein the pressure sensor outputs an initial signal value when the pressure sensor undergoes the initial deformation, and the pressure sensor outputs a signal value less than the initial signal value and the walk-behind working machine stops when the operation member is pulled backward.

3. The walk-behind working machine of claim 1, wherein the pressure sensor outputs an initial signal value when the pressure sensor undergoes the initial deformation, and the pressure sensor outputs a signal value greater than the initial signal value and the walk-behind working machine starts to move by itself when the operation member is pushed forward.

4. The walk-behind working machine of claim 1, wherein a signal value outputted by the pressure sensor changes with the thrust when the gripping portion receives the thrust, the signal value comprises values within a first interval and values within a second interval, the deformation amount of the pressure sensor when the pressure sensor outputs the values within the first interval is less than the deformation amount of the pressure sensor when the pressure sensor outputs the values within the second interval, and an initial signal value is the values within the second interval when the pressure sensor undergoes the initial deformation.

5. The walk-behind working machine of claim 4, wherein values within the first interval are distributed nonlinearly and values within the second interval are distributed linearly.

6. The walk-behind working machine of claim 1, wherein the preload element is configured to be an elastic member.

7. The walk-behind working machine of claim 1, wherein the preload element is disposed on an upper side of the pressure sensor.

8. The walk-behind working machine of claim 1, wherein the preload element is disposed on a lower side of the pressure sensor.

9. The walk-behind working machine of claim 1, wherein the preload element is mounted to the pressing member and applies the preload force to the pressing member.

10. The walk-behind working machine of claim 1, wherein the preload element applies the preload force to the pressing member.

11. The walk-behind working machine of claim 1, wherein the preload element is a pressure spring.

12. A walk-behind working machine, comprising:
a main body comprising a moving assembly and a drive motor configured to drive the moving assembly; and
a handle device connected to the main body,
wherein the handle device comprises:
an operation member comprising a gripping portion for a user to grip;
a connecting rod configured to connect the operation member to the main body;
a pressure sensor configured to sense a thrust that is applied to the handle device to drive the walk-behind working machine to move;
a preload element configured to generating a preload force that causes the pressure sensor to undergo initial deformation, and
wherein the preload element is disposed on an upper side of the pressure sensor.

13. The walk-behind working machine of claim 12, wherein the preload element is configured to be an elastic member.

14. The walk-behind working machine of claim 12, wherein the preload element is configured to be an elastic spring.

15. A walk-behind working machine, comprising:
a main body comprising a moving assembly and a drive motor configured to drive the moving assembly; and
a handle device connected to the main body,
wherein the handle device comprises:
an operation member comprising a gripping portion for a user to grip;
a connecting rod configured to connect the operation member to the main body;
a pressure sensor configured to sense a thrust that is applied to the handle device to drive the walk-behind working machine to move;
a preload element configured to generating a preload force that causes the pressure sensor to undergo initial deformation, and
wherein the preload element is disposed on a lower side of the pressure sensor.

16. A walk-behind working machine, comprising:
a main body comprising a moving assembly and a drive motor configured to drive the moving assembly; and
a handle device connected to the main body,
wherein the handle device comprises:
an operation member comprising a gripping portion for a user to grip;
a connecting rod configured to connect the operation member to the main body;
a pressure sensor configured to sense a thrust that is applied to the handle device to drive the walk-behind working machine to move;
a preload element configured to generating a preload force that causes the pressure sensor to undergo initial deformation, and
wherein the handle device further comprises a pressing member comprising a triggering portion for pressing the pressure sensor.

17. The walk-behind working machine of claim 16, wherein the preload element is mounted to the pressing member and applies the preload force to the pressing member.

* * * * *

UNITED STATES PATENT AND TRADEMARK OFFICE
CERTIFICATE OF CORRECTION

| | |
|---|---|
| PATENT NO. | : 11,844,305 B2 |
| APPLICATION NO. | : 17/869830 |
| DATED | : December 19, 2023 |
| INVENTOR(S) | : Yufei Ren et al. |

It is certified that error appears in the above-identified patent and that said Letters Patent is hereby corrected as shown below:

On the Title Page

(73) Assignee: [Chevron] should be "Chervon"

Signed and Sealed this
Second Day of April, 2024

Katherine Kelly Vidal
*Director of the United States Patent and Trademark Office*